(12) United States Patent
Nishihata et al.

(10) Patent No.: US 9,128,270 B2
(45) Date of Patent: Sep. 8, 2015

(54) IMAGING LENS AND IMAGING APPARATUS INCLUDING THE IMAGING LENS

(71) Applicant: FUJIFILM Corporation, Tokyo (JP)

(72) Inventors: Sumihiro Nishihata, Saitama-ken (JP); Yoshiaki Ishii, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/103,388

(22) Filed: Dec. 11, 2013

(65) Prior Publication Data
US 2014/0160580 A1 Jun. 12, 2014

Related U.S. Application Data

(60) Provisional application No. 61/745,954, filed on Dec. 26, 2012.

(30) Foreign Application Priority Data

Dec. 10, 2012 (JP) .................... 2012-269267

(51) Int. Cl.
| | |
|---|---|
| G02B 9/64 | (2006.01) |
| G02B 3/02 | (2006.01) |
| G02B 13/18 | (2006.01) |
| G02B 13/02 | (2006.01) |
| G02B 3/04 | (2006.01) |
| G02B 13/00 | (2006.01) |

(52) U.S. Cl.
CPC .... *G02B 13/02* (2013.01); *G02B 3/04* (2013.01); *G02B 9/64* (2013.01); *G02B 13/0045* (2013.01); *G02B 13/18* (2013.01)

(58) Field of Classification Search
CPC ............ G02B 3/04; G02B 13/18; G02B 9/64
USPC ............................................ 359/708, 755
See application file for complete search history.

(56) References Cited

U.S. PATENT DOCUMENTS 8,599,495 B1 * 12/2013 Tsai et al. ............... 359/708

FOREIGN PATENT DOCUMENTS

JP 2012-155223 8/2012

* cited by examiner

*Primary Examiner* — William Choi
(74) *Attorney, Agent, or Firm* — Young & Thompson

(57) ABSTRACT

An imaging lens consists of seven lenses of a first lens that has positive refractive power in the vicinity of an optical axis and a convex surface facing an object side in the vicinity of the optical axis, a second lens, a third lens, a fourth lens, a fifth lens, a sixth lens, and a seventh lens having a concave surface facing an image side in the vicinity of the optical axis, and at least one of the surfaces of which includes an inflection point, and both of the surfaces of which are aspherical, which are in this order from the object side. Further, each of the first lens through the seventh lens is a single lens.

18 Claims, 16 Drawing Sheets

EXAMPLE 1

EXAMPLE 2

EXAMPLE 7

EXAMPLE 3

EXAMPLE 6

IMAGING LENS AND IMAGING APPARATUS INCLUDING THE IMAGING LENS

BACKGROUND OF THE INVENTION

1. Field of the Invention

This invention relates to a fixed-focus imaging lens that forms an optical image of a subject on an imaging device, such as a CCD (Charge Coupled Device) and a CMOS (Complementary Metal Oxide Semiconductor), and to an imaging apparatus, such as a digital still camera, a cellular phone with a camera, an information mobile terminal (PDA: Personal Digital Assistance), a smartphone, a mobile game machine, and a tablet terminal, on which the imaging lens is mounted to perform photography.

2. Description of the Related Art

As personal computers became owned by many families and the like in recent years, digital still cameras, which can input image data of a landscape, a portrait and the like obtained by photography into the personal computers, have rapidly spread. Further, camera modules for inputting images became often mounted on cellular phones, smartphones and tablet terminals. Such equipment having an imaging function uses an imaging device, such as a CCD and a CMOS. As the size of the imaging device became small in recent years, the total size of imaging equipment and the size of an imaging lens to be mounted on the imaging equipment also need to be reduced. Further, since the resolution of the imaging device has become higher at the same time, the imaging lens needs to have high resolution and high performance. For example, the imaging lens needs to have performance corresponding to high resolution of 5 megapixels or higher, and desirably performance corresponding to 8 megapixels or higher.

To satisfy such need, Japanese Unexamined Patent Publication No. 2012-155223 (Patent Document 1) discloses a lens system consisting of seven lenses, which are a relatively large number of lenses, to reduce the total length of the lens system and to increase resolution.

SUMMARY OF THE INVENTION

However, the lens disclosed in Patent Document 1, which consists of seven lenses, further needs to correct various aberrations in an excellent manner to satisfy the aforementioned need for higher performance.

In view of the foregoing circumstances, it is an object of the present invention to provide an imaging lens that can correct aberrations in an excellent manner and achieve high image formation performance from a center of an angle of view through a peripheral portion of the angle of view, and an imaging apparatus on which the imaging lens is mounted, and which can obtain a high resolution imaging image.

The imaging lens of the present invention is an imaging lens substantially consisting of seven lenses of:

a first lens that has positive refractive power in the vicinity of an optical axis and a convex surface facing an object side in the vicinity of the optical axis;

a second lens;

a third lens;

a fourth lens;

a fifth lens;

a sixth lens; and a seventh lens having a concave surface facing an image side in the vicinity of the optical axis, and at least one of the surfaces of which includes an inflection point, and both of the surfaces of which are aspherical, which are in this order from the object side, wherein each of the first lens through the seventh lens is a single lens.

In the imaging lens of the present invention, the expression "substantially consisting of seven lenses" means that the imaging lens of the present invention may include a lens substantially without power, an optical element, such as a stop and a cover glass, which is not a lens, a mechanism part, such as a lens flange, a lens barrel, an imaging device and a hand shake blur correction mechanism, and the like besides the seven lenses. When the lens includes an aspherical surface, the sign of the surface shape and refractive power of the lens is considered in a paraxial region.

Further, the term "single lens" refers to a lens consisting of one lens, and which is not a cemented lens.

It is possible to improve the optical performance of the imaging lens of the present invention by further adopting and satisfying the following desirable structure or structures.

It is desirable that the imaging lens of the present invention further includes an aperture stop arranged on the object side of an object-side surface of the third lens.

In the imaging lens of the present invention, it is desirable that the fifth lens has positive refractive power in the vicinity of the optical axis.

In the imaging lens of the present invention, it is desirable that the first lens has a meniscus shape in the vicinity of the optical axis.

In the imaging lens of the present invention, it is desirable that the second lens has a convex surface facing the object side in the vicinity of the optical axis.

In the imaging lens of the present invention, it is desirable that the third lens has a concave surface facing the object side in the vicinity of the optical axis.

In the imaging lens of the present invention, it is desirable that the fourth lens has a convex surface facing the object side in the vicinity of the optical axis.

In the imaging lens of the present invention, it is desirable that the sixth lens has a convex surface facing the image side in the vicinity of the optical axis.

It is desirable that the imaging lens of the present invention satisfies at least one of the following conditional formulas (1) through (8). As a desirable mode, the imaging lens may satisfy one of the following conditional formulas (1) through (8). Alternatively, the imaging lens may satisfy an arbitrary combination of conditional formulas (1) through (8):

$$f/f67 < 0 \tag{1}$$

$$-2 < f/f67 < -0.1 \tag{1-1}$$

$$0 < f/f123 < 1 \tag{2}$$

$$0.2 < f/f123 < 0.72 \tag{2-1}$$

$$\min \nu d < 35 \tag{3}$$

$$0.2 < \Sigma Dt/\Sigma D < 0.67 \tag{4}$$

$$0.2 < \Sigma Dt/TCL < 0.6 \tag{5}$$

$$0 < f/f1 < 1.1 \tag{6}$$

$$0.2 < \Sigma Dt/\Sigma Da < 2.6 \tag{7}$$

$$0 < f/f6 < 1.52 \tag{8}$$

where f67: a combined focal length of the sixth lens and the seventh lens, f: a focal length of an entire system, f123: a combined focal length of the first lens, the second lens and the third lens, minvd: the smallest one of Abbe numbers for d-line of lenses with negative refractive power included in the imaging lens, ΣDt: a sum of center thicknesses of the first lens through the seventh lens, ΣD: a length on the optical axis from an object-side surface of the first lens to an image-side surface of the seventh lens, TCL: a length on an optical axis from an object-side surface of the first lens to an image formation surface, f1: a focal length of the first lens, ΣDa: a sum of the lengths of air spaces on an optical axis from an image-side surface of the first lens through an object-side surface of the seventh lens, and f6: a focal length of the sixth lens.

With respect to the length on the optical axis from the object-side surface of the first lens to the image formation surface (total lens length), distance in air is used for a back focus portion. For example, when a member, such as a filter and a cover glass, which does not have any refractive power is inserted between the most-image-side lens and the image formation surface, distance in air is used for the thickness of this member.

The imaging apparatus of the present invention includes the imaging lens of the present invention.

The imaging apparatus of the present invention can obtain high resolution imaging signals based on a high resolution optical image obtained by the imaging lens of the present invention.

EFFECTS OF THE INVENTION

According to the imaging lens of the present invention, the structure of each lens element is optimized in a lens structure consisting of seven lenses in total. Especially, all of lenses, which are the first lens through the seventh lens, are single lenses. Therefore, it is possible to excellently correct various aberrations, and to achieve a lens system having high image formation performance from a center of an angle of view through a peripheral portion of the angle of view.

Further, according to the imaging apparatus of the present invention, imaging signals based on an optical image formed by the imaging lens of the present invention, which has high image formation performance, are output. Therefore, it is possible to obtain high resolution photography images.

DESCRIPTION OF THE PREFERRED EMBODIMENTS

With reference to drawings, embodiments of the present invention will be described in detail.

Figure 1:
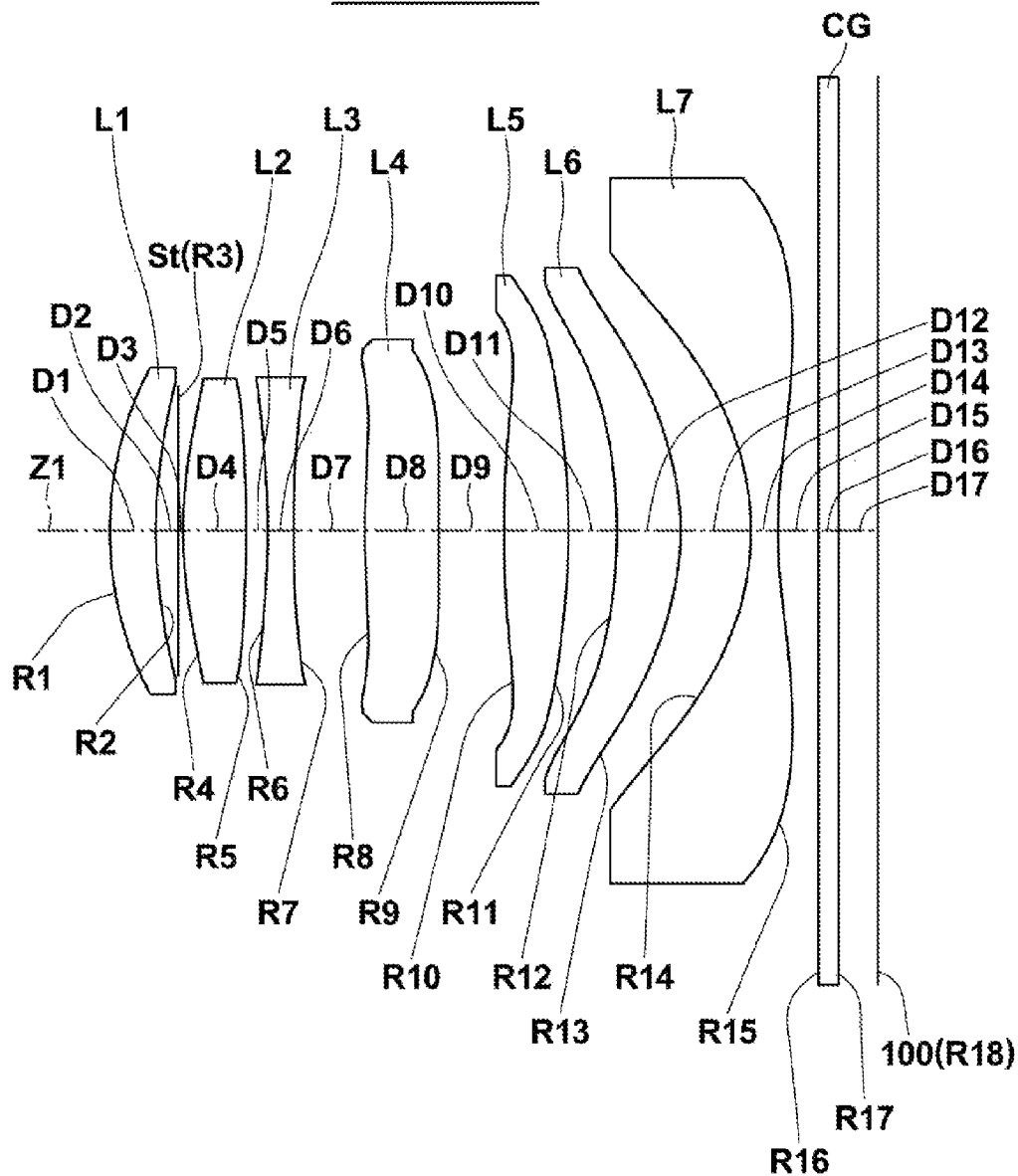
FIG. 1 is a diagram illustrating a first structural example of an imaging lens according to an embodiment of the present invention, and which is a lens cross section corresponding to Example 1.
Figure 8:
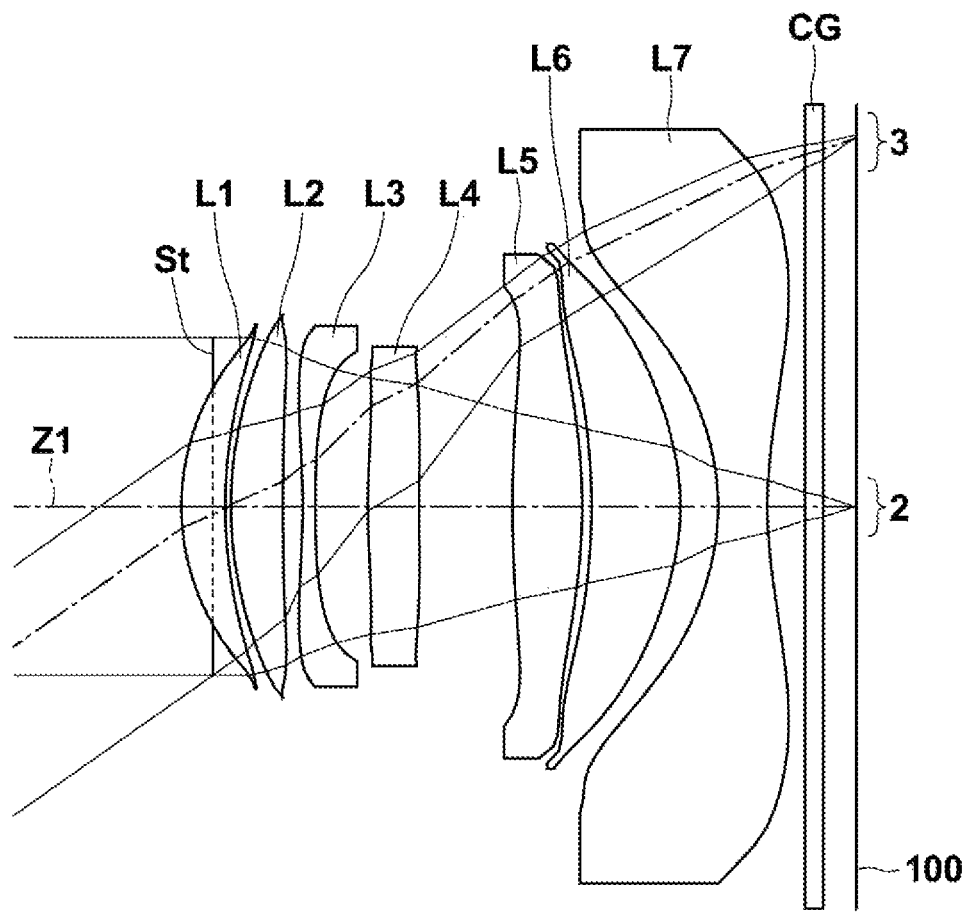
FIG. 8 is a cross section illustrating optical paths of the imaging lens illustrated in FIG. 3.

FIG. 1 is a diagram illustrating a structural example in a first embodiment of an imaging lens according to an embodiment of the present invention. This structural example corresponds to a lens structure of a first numerical value example (Table 1 and Table 2), which will be described later. Similarly, FIG. 2 through FIG. 7 illustrate cross sections of structural examples in second through seventh embodiments, which correspond to lens structures of second through seventh numerical value examples (Table 3 through Table 14). In FIG. 1 through FIG. 7, sign Ri represents the curvature radius of an i-th surface when the most object-side surface of lens elements is the first surface, and signs are assigned in such a manner that the value of i sequentially increases toward the image side (image formation side). Sign Di represents a distance on optical axis Z1 between the i-th surface and (i+1)th surface. Here, the basic structure of each structural example is the same. Therefore, basically, the structural example of the imaging lens illustrated in FIG. 1 will be described, and structural examples illustrated in FIG. 2 through FIG. 7 will be also described, if necessary. Further, FIG. 8 is a diagram illustrating optical paths of imaging lens L illustrated in FIG. 3. FIG. 8 illustrates optical paths of axial rays 2 from an object point at infinity and rays 3 at the maximum angle of view.

Imaging lens L according to an embodiment of the present invention is appropriate to be used in various kinds of imaging equipment using an imaging device, such as a CCD and a CMOS. Especially, imaging lens L is appropriate for a relatively small-sized mobile terminal equipment, for example, such as a digital still camera, a cellular phone with a camera, a smartphone, a tablet terminal and a PDA. This imaging lens L includes, along optical axis Z1, first lens L1, second lens L2, third lens L3, fourth lens L4, fifth lens L5, sixth lens L6 and seventh lens L7 in this order from the object side.

Figure 16:
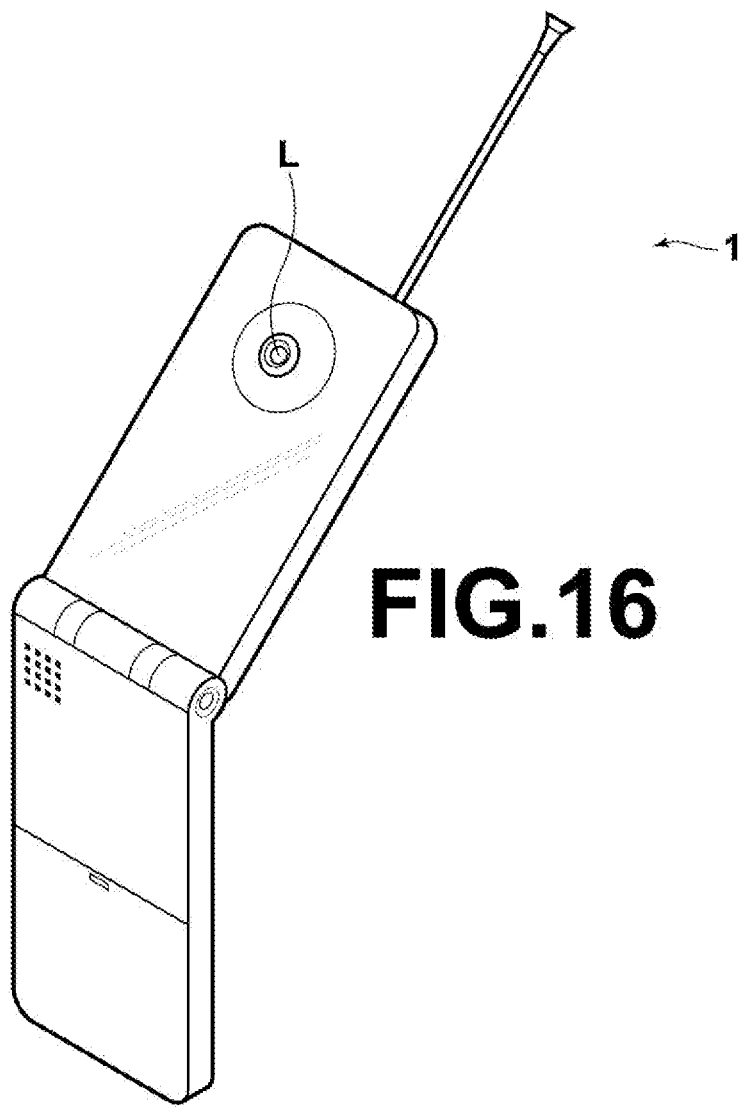
FIG. 16 is a diagram illustrating an imaging apparatus that is a cellular phone terminal including an imaging lens of the present invention.

FIG. 16 is a schematic diagram illustrating a cellular phone terminal, which is an imaging apparatus 1 according to an embodiment of the present invention. The imaging apparatus 1 according to the embodiment of the present invention includes imaging lens L according to an embodiment of the present invention and an imaging device 100, such as a CCD, which outputs imaging signals based on an optical image formed by imaging lens L (please refer to FIG. 1). The imaging device 100 is arranged at an image formation surface of imaging lens L (imaging surface).

Figure 17:
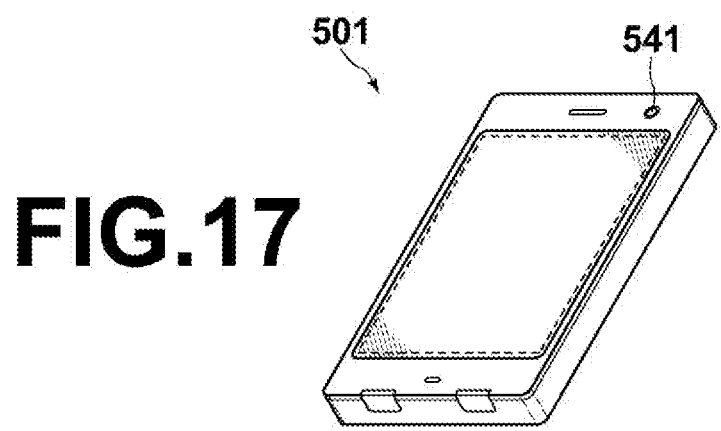
FIG. 17 is a diagram illustrating an imaging apparatus that is a smartphone including an imaging lens of the present invention.

FIG. 17 is a schematic diagram illustrating a smartphone, which is an imaging apparatus 501 according to an embodiment of the present invention. The imaging apparatus 501 according to the embodiment of the present invention includes a camera unit 541 including imaging lens L according to an embodiment of the present invention and the imaging device 100, such as a CCD, which outputs imaging signals based on an optical image formed by imaging lens L (please refer to FIG. 1). The imaging device 100 is arranged at an image formation surface of imaging lens L (imaging surface).

Various kinds of optical member CG may be arranged between seventh lens L7 and the imaging device 100 based on the structure of a camera on which a lens is mounted. For example, a flat-plate-shaped optical member, such as a cover glass for protecting an imaging surface and an infrared-ray cut filter, may be arranged. In this case, for example, a flat-plate-shaped cover glass to which coating having an effect of a filter, such as an infrared-ray cut filter and an ND filter, has been applied may be used as optical member CG.

Alternatively, an effect similar to optical member CG may be given to seventh lens L7 or the like by applying coating to seventh lens L7 or the like without using optical member CG. Then, it is possible to reduce the number of parts, and to reduce the total length.

Further, imaging lens L includes aperture stop St arranged on the object side of an object-side surface of third lens L3. Since the aperture stop is arranged on the object side of the object-side surface of third lens L3 in this manner, it is possible to prevent an angle of incidence of rays entering an image formation surface (imaging device) from becoming large especially in a peripheral portion of an image formation area when the rays pass through the optical system. It is more desirable that aperture stop St is arranged on the object side of an object-side surface of second lens L2 in the optical axis direction to further enhance this effect. It is even more desirable that aperture stop St is arranged on the object side of an object-side surface of first lens L1 in the optical axis direction. Here, the expression "arranged on the object side of the object-side surface of third lens L3" means that the position of the aperture stop in the optical axis direction is the same as an intersection of an axial marginal ray and the object-side surface of third lens L3 or located on the object side of the intersection. Similarly, the expression "arranged on the object side of an object-side surface of second lens L2 (or first lens L1)" means that the position of the aperture stop in the optical axis direction is the same as an intersection of an axial marginal ray and the object-side surface of second lens L2 (or first lens L1) or located on the object side of the intersection.

When aperture stop St is arranged on the object side of the object-side surface of the first lens, it is desirable that aperture stop St is arranged on the image side of a vertex of the surface of first lens L1. When aperture stop St is arranged on the image side of the vertex of the surface of first lens L1 in this manner, it is possible to reduce the total length of the imaging lens including aperture stop St. However, the position of aperture stop St is not limited to this position, and aperture stop St may be arranged on the object side of the vertex of the surface of first lens L1. The arrangement in which aperture stop St is located on the object side of the vertex of the surface of first lens L1 is slightly disadvantageous to securing a peripheral light amount, compared with a case in which aperture stop St is located on the image side of the vertex of the surface of first lens L1. However, the arrangement can prevent an angle of incidence of rays entering an image formation surface (imaging device) from becoming large in a peripheral portion of an image formation area in a more desirable manner when the rays pass through the optical system. Lenses according to the second through seventh embodiments (please refer to FIG. 2 through FIG. 7) are structural examples in which aperture stop St is arranged on the object side of the object-side surface of first lens L1 in the optical axis direction, and further aperture stop St is arranged on the image side of the vertex of the surface of first lens L1.

As illustrated in the first embodiment (please refer to FIG. 1), aperture stop St may be arranged between first lens L1 and second lens L2 in the optical axis direction. In this case, it is possible to excellently correct curvature of field. The arrangement in which aperture stop St is located between first lens L1 and second lens L2 in the optical axis direction is disadvantageous to securing the telecentricity, in other words, making a principal ray parallel to the optical axis as much as possible (making an angle of incidence of rays entering an imaging surface close to zero), compared with a case in which aperture stop St is arranged on the object side of the object-side surface of first lens L1 in the optical axis direction. However, it is possible to achieve excellent optical performance by adopting an imaging device in which a drop in light receiving efficiencies and generation of color mixture, which will be caused by an increase in the angle of incidence, are reduced, compared with conventional imaging devices. Such an imaging device was realized by development of imaging device techniques in recent years.

In imaging lens L, first lens L1 has positive refractive power in the vicinity of the optical axis. First lens L1 has a convex surface facing the object side in the vicinity of the optical axis. When first lens L1, which has a main image formation function of imaging lens L, has a convex surface facing the object side in the vicinity of the optical axis in this manner, it is possible to give sufficient positive refractive power to first lens L1. Therefore, it is possible to reduce the total length of imaging lens L in a desirable manner. It is more desirable that first lens L1 has a meniscus shape with a convex surface facing the object side in the vicinity of the optical axis to further enhance this effect, as illustrated in the first through seventh embodiments.

Second lens L2 may have positive refractive power in the vicinity of the optical axis or negative refractive power in the vicinity of the optical axis as long as three lenses of first lens L1 through third lens L3, as a whole, have positive refractive power in the vicinity of the optical axis. When first lens L1 and second lens L2 have positive refractive power in the vicinity of the optical axis as in the first through seventh embodiments, it is possible to achieve a small F-number in a desirable manner.

Further, it is desirable that second lens L2 has a convex surface facing the object side in the vicinity of the optical axis. When second lens L2 has a convex surface facing the object side in the vicinity of the optical axis, it is possible to locate a rear-side principal point of the entire imaging lens further to the object side. Therefore, it is possible to reduce the total length in a desirable manner. It is desirable that second lens L2 has a meniscus shape with a convex surface facing the object side in the vicinity of the optical axis, as illustrated in the third and fourth embodiments (please refer to FIGS. 3 and 4), to further enhance this effect. Further, as illustrated in the first, second and fifth through seventh embodiments (please refer to FIGS. 1, 2 and 5 through 7), second lens L2 may have a biconvex shape in the vicinity of the optical axis. To achieve the second lens with about the same level of positive refractive power in the vicinity of the optical axis, it is possible to make the absolute value of a curvature radius of second lens L2 in the vicinity of the optical axis relatively large by making the shape of second lens L2 biconvex in the vicinity of the optical axis, compared with a case in which the shape of second lens L2 is a meniscus shape in the vicinity of the optical axis. Therefore, when second lens L2 has a biconvex shape in the vicinity of the optical axis, it is possible to more excellently correct a spherical aberration.

Third lens L3 may have positive refractive power or negative refractive power in the vicinity of the optical axis as long as three lenses of first lens L1 through third lens L3, as a whole, have positive refractive power in the vicinity of the optical axis. It is desirable that three lenses of first lens L1 through third lens L3, as a whole, have positive refractive power in the vicinity of the optical axis, and that at least second lens L2 or third lens L3 has negative refractive power in the vicinity of the optical axis. In this case, correction of chromatic aberrations is easy. In the first through seventh embodiments, third lens L3 has negative refractive power in the vicinity of the optical axis. Therefore, the above-mentioned effect is achievable.

When third lens L3 has negative refractive power in the vicinity of the optical axis, it is desirable that third lens L3 has a concave surface facing the image side in the vicinity of the optical axis. Then, it is possible to correct a spherical aberration and chromatic aberrations in a more desirable manner, compared with a case in which third lens L3 has a convex surface facing the image side in the vicinity of the optical axis. Further, as illustrated in the first through seventh embodiments, it is desirable that third lens L3 has a biconcave shape in the vicinity of the optical axis. To achieve the third lens with about the same level of negative refractive power in the vicinity of the optical axis, it is possible to make the absolute value of a curvature radius of third lens L3 in the vicinity of the optical axis relatively large by making the shape of third lens L3 biconcave in the vicinity of the optical axis, compared with a case in which the shape of third lens L3 is a meniscus shape in the vicinity of the optical axis. Therefore, when third lens L3 has a biconcave shape in the vicinity of the optical axis, it is possible to suppress generation of a high-order spherical aberration in a more desirable manner.

Fourth lens L4 may have negative refractive power or positive refractive power in the vicinity of the optical axis as long as various aberrations generated while rays were passing through first lens L1 through third lens L3 are corrected in a well-balanced manner. As illustrated in the first through seventh embodiments, when fourth lens L4 has positive refractive power, it is possible to excellently correct a spherical aberration. When fourth lens L4 has negative refractive power, it is possible to excellently correct a longitudinal chromatic aberration. Further, it is desirable that fourth lens L4 has a convex surface facing the object side in the vicinity of the optical axis. When fourth lens L4 has a convex surface facing the object side in the vicinity of the optical axis, it is possible to locate a rear-side principal point of the entire imaging lens further to the object side. Therefore, it is possible to reduce the total length in a desirable manner. It is desirable that fourth lens L4 has a meniscus shape with a convex surface facing the object side in the vicinity of the optical axis, as illustrated in the first through seventh embodiments, to further enhance this effect.

It is desirable that fifth lens L5 has positive refractive power in the vicinity of the optical axis. When fifth lens L5 with positive refractive power is arranged close to an image formation surface in the optical axis direction of the imaging lens, it is possible to prevent an angle of incidence of rays entering the image formation surface (imaging device) from becoming large especially in a middle angle of view when the rays pass through the optical system. In the specification of the present invention, the term "middle angle of view" means an angle of view that is about 40% or greater and 70% or less of a half angle of view.

It is desirable that fifth lens L5 has a convex surface facing the object side in the vicinity of the optical axis. When fifth lens L5 has a convex surface facing the object side, it is possible to locate a rear-side principal point of the entire imaging lens further to the object side. Therefore, it is possible to reduce the total length in a desirable manner. It is desirable that fifth lens L5 has a biconvex shape in the vicinity of the optical axis, as illustrated in the first through seventh embodiments. To achieve fifth lens L5 with about the same level of positive refractive power in the vicinity of the optical axis, it is possible to make the absolute value of a curvature radius of fifth lens L5 in the vicinity of the optical axis relatively large by making the shape of fifth lens L5 biconvex in the vicinity of the optical axis, compared with a case in which the shape of fifth lens L5 is a meniscus shape in the vicinity of the optical axis, as described already. Therefore, when fifth lens L5 has a biconvex shape in the vicinity of the optical axis, it is possible to more excellently correct a spherical aberration.

Sixth lens L6 may have positive refractive power or negative refractive power in the vicinity of the optical axis as long as two lenses of sixth lens L6 and seventh lens L7, as a whole, have negative refractive power in the vicinity of the optical axis. When sixth lens L6 has positive refractive power in the vicinity of the optical axis, as illustrated in the first through seventh embodiments, it is possible to prevent an angle of incidence of rays entering an image formation surface (imaging device) from becoming large especially in a middle angle of view when the rays pass through the optical system by arranging sixth lens L6 with positive refractive power close to the image formation surface in the optical axis direction of the imaging lens.

Further, it is desirable that sixth lens L6 has a convex surface facing the image side in the vicinity of the optical axis. In this case, it is possible to locate a rear-side principal point of the entire imaging lens further to the object side. Therefore, it is possible to reduce the total length in a desirable manner. It is desirable that sixth lens L6 has a meniscus shape with a convex surface facing the image side, as illustrated in the first through seventh embodiments, to further enhance this effect.

As illustrated in the first through seventh embodiments, it is desirable that seventh lens L7 has negative refractive power in the vicinity of the optical axis. When the seventh lens has negative refractive power, if the first lens through the sixth lens are regarded as one positive optical system, the entire imaging lens is structurable as a telephoto-type system. Therefore, it is possible to reduce the total length in a desirable manner.

Seventh lens L7 has a concave surface facing the image side in the vicinity of the optical axis. Therefore, it is possible to suppress an increase of curvature of field generated by reducing the total length, while reducing the total length. As illustrated in the first through seventh embodiments, it is desirable that seventh lens L7 has a biconcave shape in the vicinity of the optical axis. To achieve seventh lens L7 with about the same level of negative refractive power in the vicinity of the optical axis, it is possible to make the absolute value of a curvature radius of seventh lens L7 in the vicinity of the optical axis relatively large by making the shape of seventh lens L7 biconcave in the vicinity of the optical axis, compared with a case in which the shape of seventh lens L7 is a meniscus shape in the vicinity of the optical axis, as described already. Therefore, when seventh lens L7 has a biconcave shape in the vicinity of the optical axis, it is possible to suppress generation of a high-order spherical aberration in a more desirable manner.

Further, at least one of the surfaces of seventh lens L7 includes an inflection point or points, and both surfaces of seventh lens L7 are aspherical. Since at least one of the surfaces of seventh lens L7 includes an inflection point or points, it is possible to prevent an angle of incidence of rays entering an image formation surface (imaging device) from becoming large especially in a peripheral portion of an image formation area when the rays pass through the optical system. Here, the term "inflection point" refers to a point at which the surface shape of a lens switches from a convex shape facing the image side to a concave shape facing the image side, or a point at which the surface shape of a lens switches from a concave shape facing the image side to a convex shape facing the image side. Further, the term "peripheral portion" refers to a portion on the outside of about 50% to 70% of the maximum effective radius in the direction of the radius. It is more desirable that the image-side surface of seventh lens L7 has an aspherical shape including at least one inflection point to further enhance this effect. Further, it is even more desirable that the image-side surface of seventh lens L7 has an aspherical shape that has a concave surface facing the image side in the vicinity of the optical axis and includes at least one inflection point. Alternatively, only the object-side surface of seventh lens L7 may have an aspherical shape including at least one inflection point. It is more desirable that both of the surfaces of seventh lens L7 have aspherical shapes, each including at least one inflection point.

In the first through seventh embodiments, seventh lens L7 has a biconcave shape in the vicinity of the optical axis, and both surfaces of seventh lens L7 have aspherical shapes, each including an inflection point or points. When seventh lens L7 has a biconcave shape in the vicinity of the optical axis in this manner, it is desirable that the image-side surface includes an inflection point or points at about 40% to 60% of the maximum effective diameter toward the outside in the direction of the radius. It is desirable that the object-side surface includes an inflection point or points at about 30% to 50% of the maximum effective diameter toward the outside in the direction of the radius.

It is desirable that at least one of the surfaces of each of first lens L1 through seventh lens L7 of imaging lens L is an aspherical surface to achieve high performance.

As each embodiment of the present invention illustrates, each lens L1 through L7, which constitute imaging lens L, is not a cemented lens but a single lens. Compared with a case in which at least one of lenses L1 through L7 is a cemented lens, as in Patent Document 1, the number of lens surfaces and the number of air spaces in imaging lens L are large. Therefore, flexibility in designing each lens and each air space is higher. Imaging lens L is structured in such a manner to correct high-order aberrations in a more desirable manner than an imaging lens consisting of seven lenses using a cemented lens, as disclosed in Patent Document 1, and a conventional imaging lens consisting of six or less lenses.

Next, the action and effect about conditional formulas of imaging lens L, which is structured as described above, will be described.

First, it is desirable that focal length f of the entire system and combined focal length f67 of sixth lens L6 and seventh lens L7 satisfy the following conditional formula (1):

$$f/f67 < 0 \qquad (1).$$

Conditional formula (1) defines a desirable numerical value range of a ratio of focal length f of the entire system to combined focal length f67 of sixth lens L6 and seventh lens L7. If the value exceeds the upper limit of conditional formula (1), the negative refractive power by the two lenses of sixth lens L6 and seventh lens L7 becomes too weak, compared with the refractive power of the entire system. Therefore, it becomes difficult to locate a rear-side principal point sufficiently to the object side, and that is disadvantageous to reduction of the total length. Therefore, when the upper limit of conditional formula (1) is satisfied, it is possible to locate a rear-side principal point sufficiently to the object side, and to reduce the total length in a desirable manner. In this view, it is more desirable that the upper limit of the following conditional formula (1-1) is satisfied. It is even more desirable that the upper limit of the following conditional formula (1-2) is satisfied. Further, it is desirable to set a lower limit to conditional formula (1), and to satisfy the lower limit of conditional formula (1-1). If the value is lower than the lower limit of conditional formula (1-1), the negative refractive power of sixth lens L6 and seventh lens L7 becomes too strong, compared with the refractive power of the entire system. Therefore, it becomes difficult to sufficiently prevent an angle of incidence of rays entering an image formation surface (imaging device) from becoming large especially in a middle angle of view when the rays pass through the optical system. Therefore, when the lower limit of conditional formula (1-1) is satisfied, it is possible to prevent an angle of incidence of rays entering an image formation surface (imaging device) from becoming large especially in a middle angle of view when the rays pass through the optical system. In this view, it is more desirable that the lower limit of conditional formula (1-2) is satisfied:

$$-2 < f/f67 < -0.1 \quad (1\text{-}1);\text{ and}$$

$$-1.5 < f/f67 < -0.2 \quad (1\text{-}2).$$

Further, it is desirable that combined focal length f123 of the first lens, the second lens and third lens and focal length f of the entire system satisfy the following conditional formula (2):

$$0 < f/f123 < 1 \quad (2).$$

Conditional formula (2) defines a desirable numerical value range of a ratio of focal length f of the entire system to combined focal length f123 of first lens L1 through third lens L3. If the value exceeds the upper limit of conditional formula (2), positive refractive power by first lens L1 through third lens L3 becomes too strong, compared with the refractive power of the entire system. Therefore, it becomes difficult to sufficiently correct, by fourth lens L4 through seventh lens L7, especially high-order aberrations generated while rays are passing through first lens L1 through third lens L3. If the value is lower than the lower limit of conditional formula (2), the positive refractive power by first lens L1 through third lens L3 becomes too weak, compared with the refractive power of the entire system. Therefore, it becomes difficult to reduce the total length. When the range of conditional formula (2) is satisfied, it is possible to excellently correct various aberrations such as curvature of field, which is a high-order aberration, while reducing the total length. In this view, it is more desirable that the following conditional formula (2-1) is satisfied. It is even more desirable that the following conditional formula (2-2) is satisfied:

$$0.2 < f/f123 < 0.72 \quad (2\text{-}1);\text{ and}$$

$$0.3 < f/f123 < 0.7 \quad (2\text{-}2).$$

Further, it is desirable that Abbe number minνd, which is the smallest one of Abbe numbers for d-line of lenses with negative refractive power included in the imaging lens, satisfies the following conditional formula (3):

$$\text{min}\nu d < 35 \quad (3).$$

Conditional formula (3) defines a desirable numerical value range of Abbe number minνd, which is the smallest one of Abbe numbers for d-line of lenses with negative refractive power included in the imaging lens. If the value exceeds the upper limit of conditional formula (3), it becomes difficult to sufficiently correct a longitudinal chromatic aberration. When conditional formula (3) is satisfied, at least one of lenses with negative refractive power included in the imaging lens is made of high dispersion material, and that is advantageous to correction of a longitudinal chromatic aberration. In this view, it is more desirable that the following conditional formula (3-1) is satisfied. It is even more desirable that the following conditional formula (3-2) is satisfied:

$$\text{min}\nu d < 30 \quad (3\text{-}1);\text{ and}$$

$$\text{min}\nu d < 25 \quad (3\text{-}2).$$

Further, it is desirable that sum ΣDt of center thicknesses of first lens L1 through seventh lens L7 and length ΣD on an optical axis from an object-side surface of first lens L1 to an image-side surface of seventh lens L7 satisfy the following conditional formula (4):

$$0.2 < \Sigma Dt/\Sigma D < 0.67 \quad (4).$$

Conditional formula (4) defines a desirable numerical value range of a ratio of sum ΣDt of center thicknesses of first lens L1 through seventh lens L7 to length ΣD on an optical axis from an object-side surface of first lens L1 to an image-side surface of seventh lens L7. If the value exceeds the upper limit of conditional formula (4), sum ΣDt of center thicknesses of first lens L1 through seventh lens L7 becomes too large, compared with length ΣD on an optical axis from an object-side surface of first lens L1 to an image-side surface of seventh lens L7. Therefore, it becomes difficult to sufficiently correct astigmatism. If the value is lower than the lower limit of conditional formula (4), sum ΣDt of center thicknesses of first lens L1 through seventh lens L7 becomes too small, compared with length ΣD on the optical axis from the object-side surface of first lens L1 to the image-side surface of seventh lens L7. Therefore, it becomes difficult to sufficiently reduce the absolute value of the curvature radius of a convex-shaped lens or lenses included in imaging lens L in the vicinity of the optical axis. Therefore, it becomes difficult to structure the convex-shaped lens or lenses included in imaging lens L in such a manner that the curvature radius of the convex-shaped lens or lenses can secure refractive power necessary to achieve desirable lens performance. Further, it becomes difficult to reduce the total length. When conditional formula (4) is satisfied, it is possible to excellently correct astigmatism while reducing the total length. In this view, it is more desirable that the following conditional formula (4-1) is satisfied:

$$0.3 < \Sigma Dt/\Sigma D < 0.65 \quad (4\text{-}1).$$

Further, it is desirable that sum ΣDt of center thicknesses of first lens L1 through seventh lens L7 and length TCL on an optical axis from an object-side surface of first lens L1 to an image formation surface satisfy the following conditional formula:

$$0.2 < \Sigma Dt/TCL < 0.6 \quad (5).$$

Conditional formula (5) defines a desirable numerical value range of a ratio of sum ΣDt of center thicknesses of first lens L1 through seventh lens L7 to length (total lens length) TCL on an optical axis from an object-side surface of first lens L1 to an image formation surface. Here, distance in air is used for a back focus portion of total lens length TCL. For example, when a member without refractive power, such as a filter and a cover glass, is inserted between the most-image-side lens and the image formation surface, the back focus portion is calculated by using an equivalent distance in air for the thickness of the member. If the value exceeds the upper limit of conditional formula (5), sum ΣDt of center thicknesses of first lens L1 through seventh lens L7 becomes too large, compared with total lens length TCL. Therefore, it becomes difficult to sufficiently correct astigmatism. If the value is lower than the lower limit of conditional formula (5), sum ΣDt of center thicknesses of first lens L1 through seventh lens L7 becomes too small, compared with total lens length TCL. Therefore, it becomes difficult to sufficiently reduce the absolute value of the curvature radius of the convex-shaped lens or lenses included in imaging lens L in the vicinity of the optical axis. Therefore, it becomes difficult to structure the convex-shaped lens or lenses included in imaging lens L in such a manner that the curvature radius of the convex-shaped lens or lenses can secure refractive power necessary to achieve desirable lens performance. Further, it becomes difficult to reduce the total length. When conditional formula (5) is satisfied, it is possible to excellently correct astigmatism while reducing the total length. In this view, it is more desirable that the following conditional formula (5-1) is satisfied:

$$0.3<\Sigma Dt/TCL<0.58 \tag{5-1}$$

It is desirable that focal length f of the entire lens system and focal length f1 of first lens L1 satisfy the following conditional formula (6):

$$0<f/f1<1.1 \tag{6}$$

Conditional formula (6) defines a desirable numerical value range of a ratio of focal length f of the entire lens system to focal length f1 of first lens L1. If the value exceeds the upper limit of conditional formula (6), the refractive power of first lens L1 becomes too strong, compared with the refractive power of the entire system. Therefore, it becomes difficult to sufficiently correct a spherical aberration and astigmatism. If the value is lower than the lower limit of conditional formula (6), the refractive power of first lens L1 becomes too weak, compared with the refractive power of the entire system. Therefore, it becomes difficult to correct various aberrations while achieving a small F-number and reduction in the total length. When the range of conditional formula (6) is satisfied, it is possible to excellently correct various aberrations, such as a spherical aberration and astigmatism, while achieving reduction in the total length and a small F-number. In this view, it is more desirable that the following conditional formula (6-1) is satisfied. It is even more desirable that the following conditional formula (6-2) is satisfied:

$$0.3<f/f1<1 \tag{6-1); and}$$

$$0.5<f/f1<1 \tag{6-2}$$

It is desirable that sum $\Sigma Dt$ of center thicknesses of first lens L1 through seventh lens L7 and sum $\Sigma Da$ of the lengths of air spaces on the optical axis from an image-side surface of first lens L1 through an object-side surface of seventh lens L7 satisfy the following conditional formula (7):

$$0.2<\Sigma Dt/\Sigma Da<2.6 \tag{7}$$

Conditional formula (7) defines a desirable numerical value range of a ratio of sum $\Sigma Dt$ of center thicknesses of first lens L1 through seventh lens L7 to sum $\Sigma Da$ of the lengths of air spaces on the optical axis from an image-side surface of first lens L1 through an object-side surface of seventh lens L7. If the value exceeds the upper limit of conditional formula (7), sum $\Sigma Dt$ of center thicknesses of first lens L1 through seventh lens L7 becomes too large, compared with sum $\Sigma Da$ of the lengths of air spaces on the optical axis from an image-side surface of first lens L1 through an object-side surface of seventh lens L7. Therefore, it becomes difficult to sufficiently correct astigmatism. If the value is lower than the lower limit of conditional formula (7), sum $\Sigma Dt$ of center thicknesses of first lens L1 through seventh lens L7 becomes too small, compared with sum $\Sigma Da$ of the lengths of air spaces on the optical axis from an image-side surface of first lens L1 through an object-side surface of seventh lens L7. Therefore, it becomes difficult to sufficiently reduce the absolute value of the curvature radius of the convex-shaped lens or lenses included in imaging lens L in the vicinity of the optical axis. Therefore, it becomes difficult to structure the convex-shaped lens or lenses included in imaging lens L in such a manner that the curvature radius of the convex-shaped lens or lenses can secure refractive power necessary to achieve desirable lens performance. Further, it becomes difficult to reduce the total length. When conditional formula (7) is satisfied, it is possible to excellently correct astigmatism while reducing the total length. In this view, it is more desirable that the following conditional formula (7-1) is satisfied. It is even more desirable that the following conditional formula (7-2) is satisfied:

$$0.4<\Sigma Dt/\Sigma Da<2 \tag{7-1); and}$$

$$0.5<\Sigma Dt/\Sigma Da<1.8 \tag{7-2}$$

Further, it is desirable that focal length f of the entire lens system and focal length f6 of sixth lens L6 satisfy the following conditional formula (8):

$$0<f/f6<1.52 \tag{8}$$

Conditional formula (8) defines a desirable numerical value range of a ratio of focal length f of the entire lens system to focal length f6 of sixth lens L6. If the value exceeds the upper limit of conditional formula (8), the positive refractive power of sixth lens L6 becomes too strong, compared with the entire lens system. Therefore, it becomes difficult to sufficiently correct astigmatism, while reducing the total length. When the lower limit of conditional formula (8) is satisfied, it is possible to prevent an angle of incidence of rays entering an image formation surface (imaging device) from becoming large especially in a middle angle of view when the rays pass through the optical system. When the range of conditional formula (8) is satisfied, it is possible to excellently correct astigmatism, while reducing the total length in a desirable manner. Further, it is possible to prevent an angle of incidence of rays entering an image formation surface (imaging device) from becoming large especially in a middle angle of view when the rays pass through the optical system. In this view, it is more desirable that conditional formula (8-1) is satisfied. It is even more desirable that conditional formula (8-2) is satisfied:

$$0.3<f/f6<1.5 \tag{8-1); and}$$

$$0.5<f/f6<1.4 \tag{8-2}$$

Further, it is desirable that focal length f of the entire lens system and combined focal length f12 of first lens L1 and second lens L2 satisfy the following conditional formula (9):

$$0.85<f/f12<2 \tag{9}$$

Conditional formula (9) defines a desirable numerical value range of a ratio of focal length f of the entire lens system to combined focal length f12 of first lens L1 and second lens L2. If the value exceeds the upper limit of conditional formula (9), positive refractive power by first lens L1 and second lens L2 becomes too strong, compared with the refractive power of the entire lens system. Therefore, it becomes difficult to correct astigmatism especially in a small angle of view. If the value is lower than the lower limit of conditional formula (9), positive refractive power by first lens L1 and second lens L2 becomes too weak, compared with the refractive power of the entire lens system. Therefore, it becomes difficult to reduce the total length. When conditional formula (9) is satisfied, it is possible to excellently correct astigmatism while reducing the total length in a desirable manner. In this view, it is more desirable that the following conditional formula (9-1) is satisfied. It is even more desirable that the following conditional formula (9-2) is satisfied. Here, the term "small angle of view" refers to an angle of view that is less than about 40% of a half angle of view.

$$0.9<f/f12<1.8 \tag{9-1}$$

$$1<f/f12<1.5 \tag{9-2}$$

As described above, in imaging lens L according to an embodiment of the present invention, the structure of each lens element is optimized in a lens structure of seven lenses in total. Especially, all of the first lens through the seventh lens are single lenses. Therefore, it is possible to excellently correct various aberrations, and to achieve a lens system having high resolution performance.

Especially when a lens system is used in a cellular phone, a smartphone, a tablet or the like, the lens system needs to have a small F-number to cope with an imaging device with high density arrangement, which can achieve sufficiently high resolution. In the imaging lenses according to Embodiments 1 through 7 (please refer to FIG. 1 through FIG. 7), each lens structure is optimized. Further, each lens is structured as a single lens. Therefore, it is possible to achieve an extremely small F-number (about 1.4 through 2). It is possible to apply the imaging lens in a desirable manner to an imaging device with high density, for example, with a pitch width of 0.9 μm.

Further, when a desirable condition or conditions are appropriately satisfied, more excellent image formation performance is achievable. Further, an imaging apparatus according to an embodiment of the present invention outputs imaging signals based on an optical image formed by high performance imaging lens L according to an embodiment of the present invention. Therefore, it is possible to obtain a high resolution photography image from a center of an angle of view through a peripheral portion of the angle of view.

Next, specific numerical value examples of imaging lenses according to embodiments of the present invention will be described. Plural numerical value examples will be described collectively.

Table 1 and Table 2, which will be given later in this specification, show specific lens data corresponding to the structure of the imaging lens illustrated in FIG. 1. Specifically, Table 1 shows basic lens data, and Table 2 shows data about aspherical surfaces. In the lens data of Table 1, the column of surface number Si shows the surface number of the i-th surface for the imaging lens of Example 1. The most-object-side surface of the lens elements is the first surface (aperture stop St is the first surface), and surface numbers sequentially increase toward the image side. The column of curvature radius Ri shows the value (mm) of the curvature radius of the i-th surface from the object side, which corresponds to sign Ri assigned in FIG. 1. Similarly, the column of surface distance Di shows a distance (mm) on an optical axis between the i-th surface Si and the (i+1)th surface Si+1 from the object side. The column of Ndj shows the value of a refractive index of a j-th optical element from the object side for d-line (587.56 nm). The column of vdj shows the value of an Abbe number of the j-th optical element from the object side for d-line. Table 1 shows also focal length f (mm) of an entire system and back focus Bf (mm), as various data. Here, back focus Bf is distance in air.

In the imaging lens of Example 1, both surfaces of all of first lens L1 through seventh lens L7 are aspherical. The basic lens data in Table 1 show, as the curvature radius of each of the aspherical surfaces, the numerical value of a curvature radius in the vicinity of the optical axis (paraxial curvature radius).

Table 2 shows aspherical surface data in the imaging lens of Example 1. In the numerical values indicated as the aspherical surface data, the sign "E" represents that a number after the sign "E" is an "exponent" using 10 as a base, and that a numerical value before the sign "E" is multiplied by a numerical value represented by the exponential function using 10 as the base. For example, "1.0E-02" means "1.0×10⁻²".

As aspherical surface data, values of coefficients Ai and K in the aspherical surface equation represented by the following equation Section A are shown. Specifically, Z represents the length (mm) of a perpendicular from a point on an aspherical surface at height h from an optical axis to a plane that contacts with the vertex of the aspherical surface (the plane is perpendicular to the optical axis).

$$Z = C \cdot h^2 / \{1 + (1 - K \cdot C^2 \cdot h^2)^{1/2}\} + \Sigma A_i \cdot h^i \qquad (A),\text{ where}$$

Z: the depth of the aspherical surface (mm), h: a distance (height) from the optical axis to the lens surface (mm), C: a paraxial curvature=1/R (R: a paraxial curvature radius), Ai: the i-th order aspherical coefficient (i is an integer greater than or equal to 3), and K: an aspherical coefficient.

Figure 2:
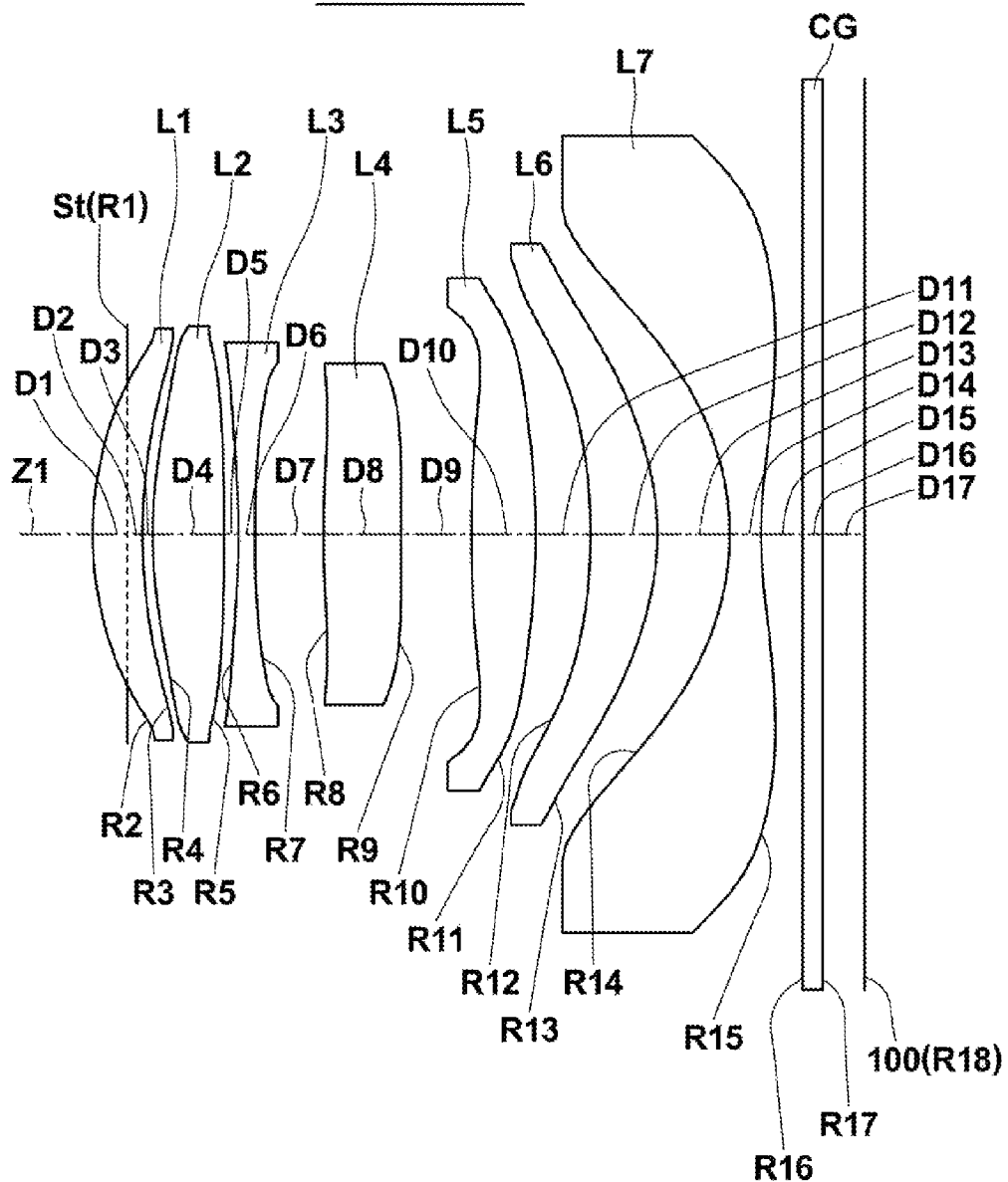
FIG. 2 is a diagram illustrating a second structural example of an imaging lens according to an embodiment of the present invention, and which is a lens cross section corresponding to Example 2.
Figure 3:
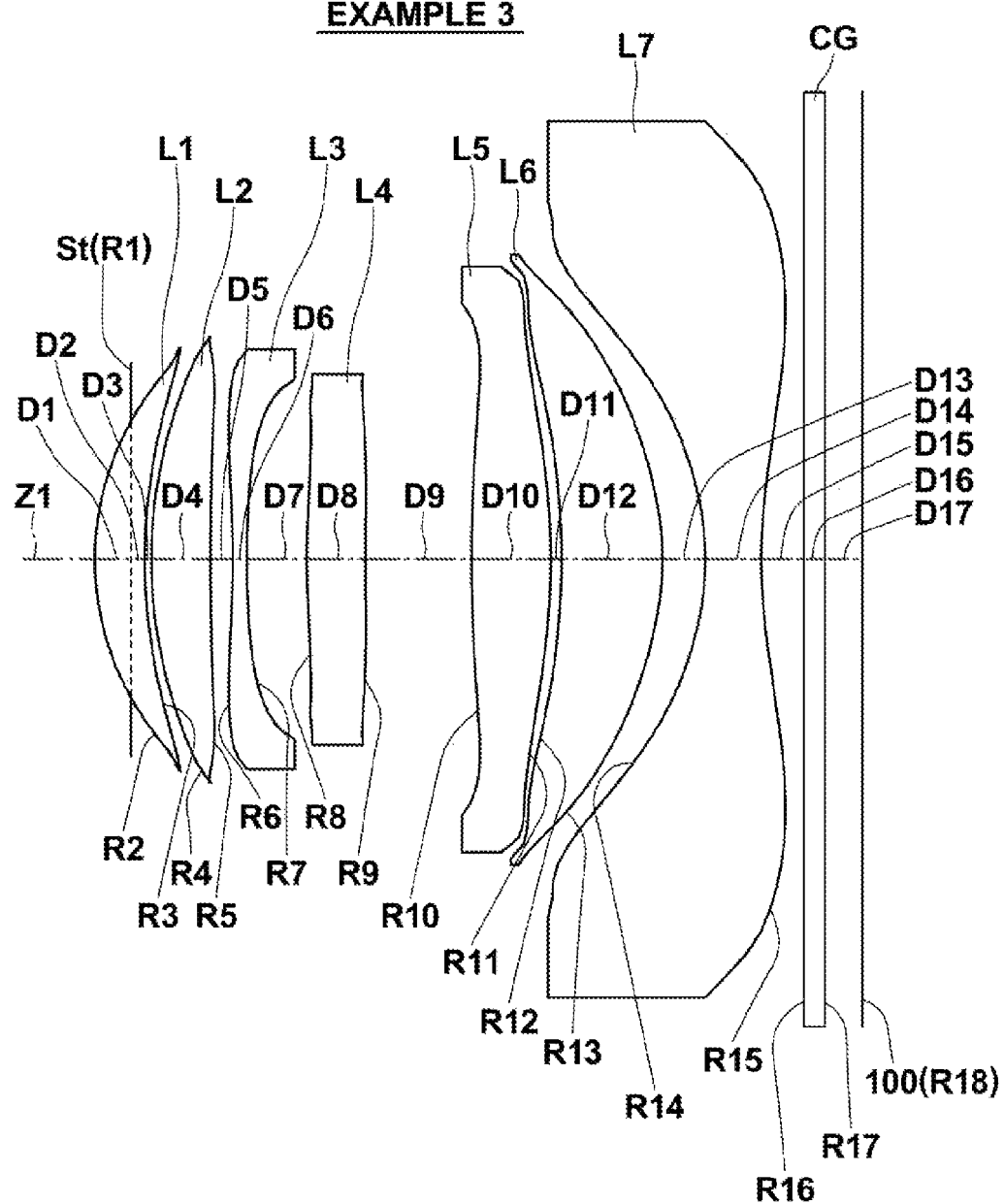
FIG. 3 is a diagram illustrating a third structural example of an imaging lens according to an embodiment of the present invention, and which is a lens cross section corresponding to Example 3.
Figure 4:
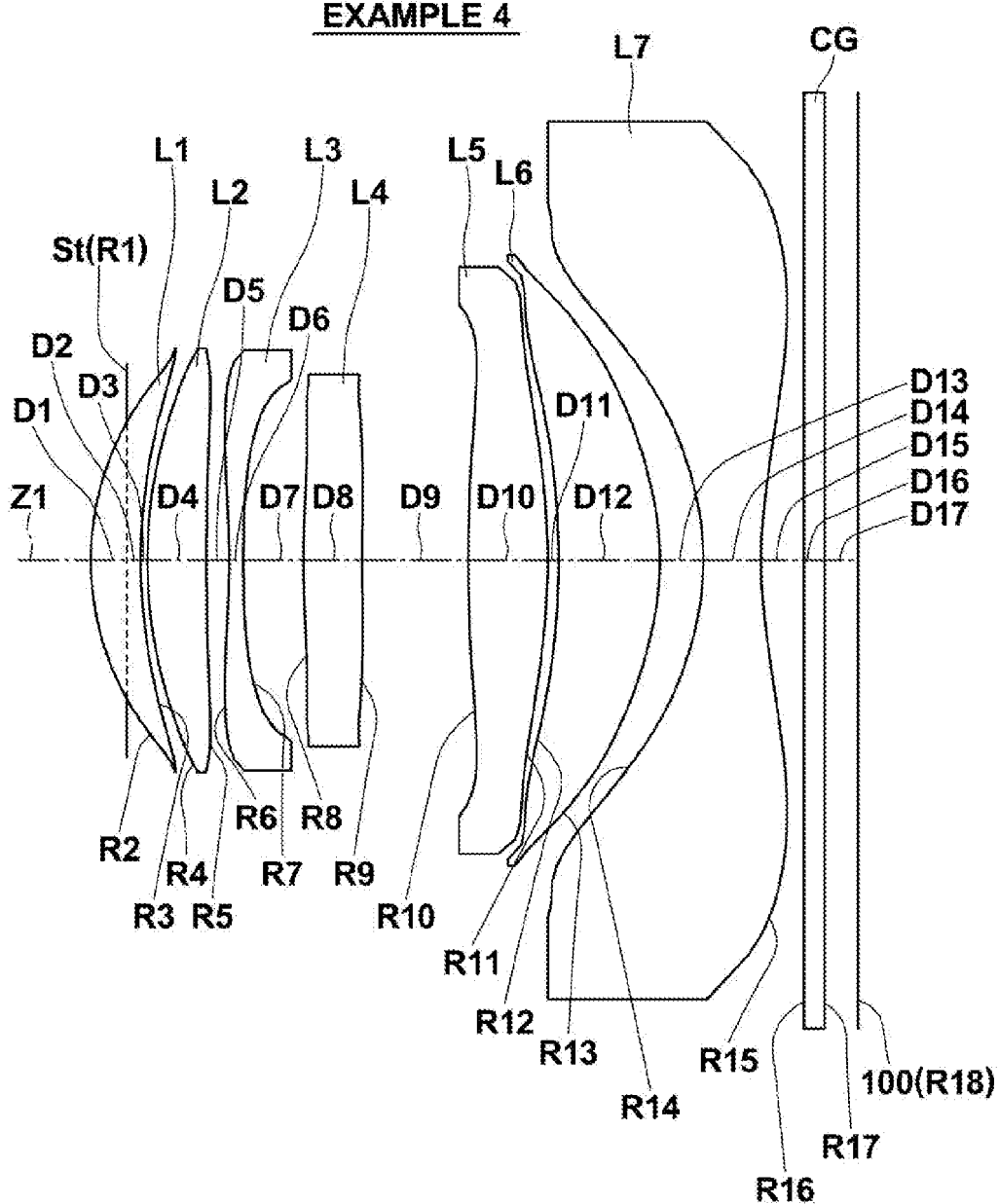
FIG. 4 is a diagram illustrating a fourth structural example of an imaging lens according to an embodiment of the present invention, and which is a lens cross section corresponding to Example 4.
Figure 5:
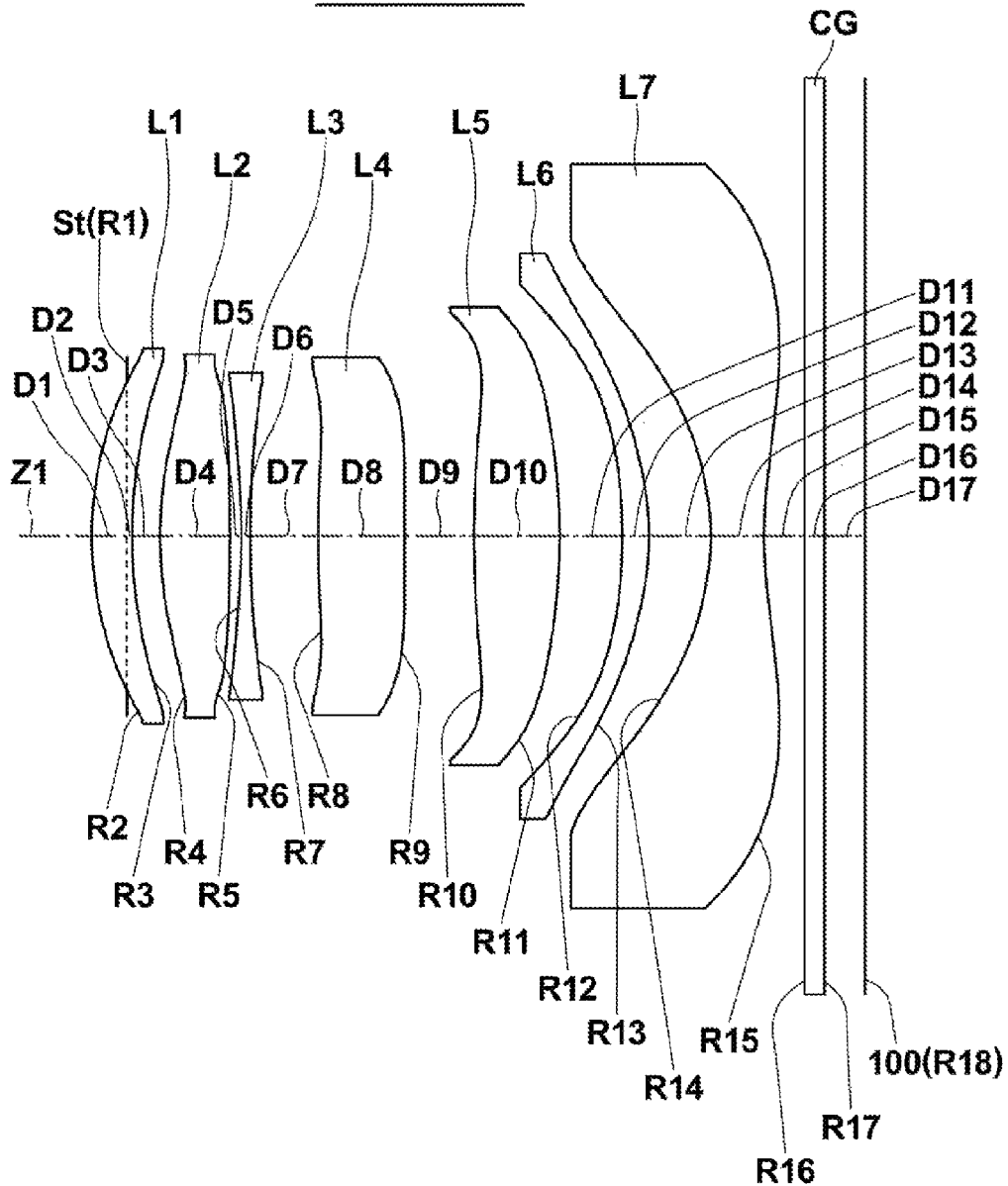
FIG. 5 is a diagram illustrating a fifth structural example of an imaging lens according to an embodiment of the present invention, and which is a lens cross section corresponding to Example 5.
Figure 6:
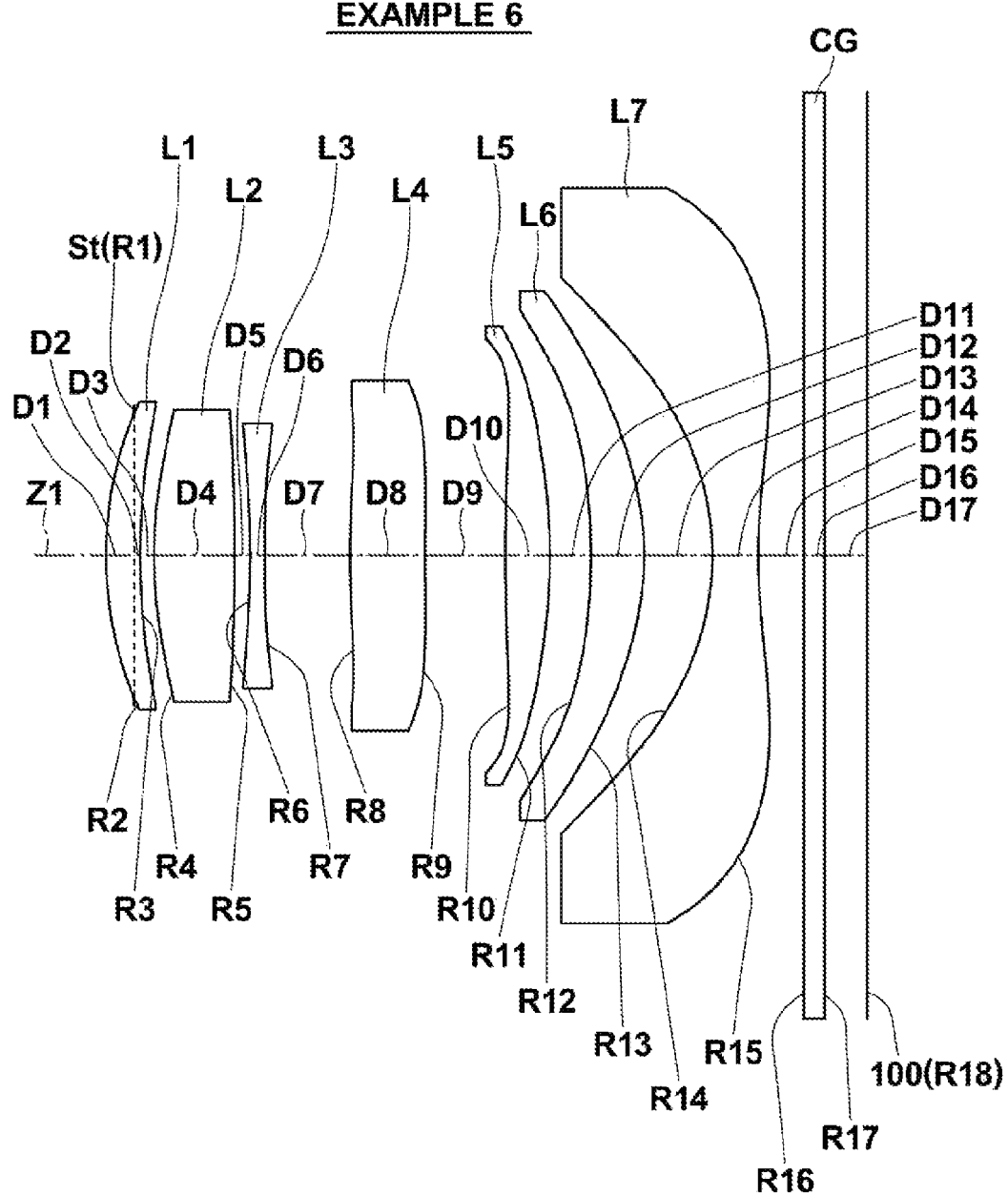
FIG. 6 is a diagram illustrating a sixth structural example of an imaging lens according to an embodiment of the present invention, and which is a lens cross section corresponding to Example 6.
Figure 7:
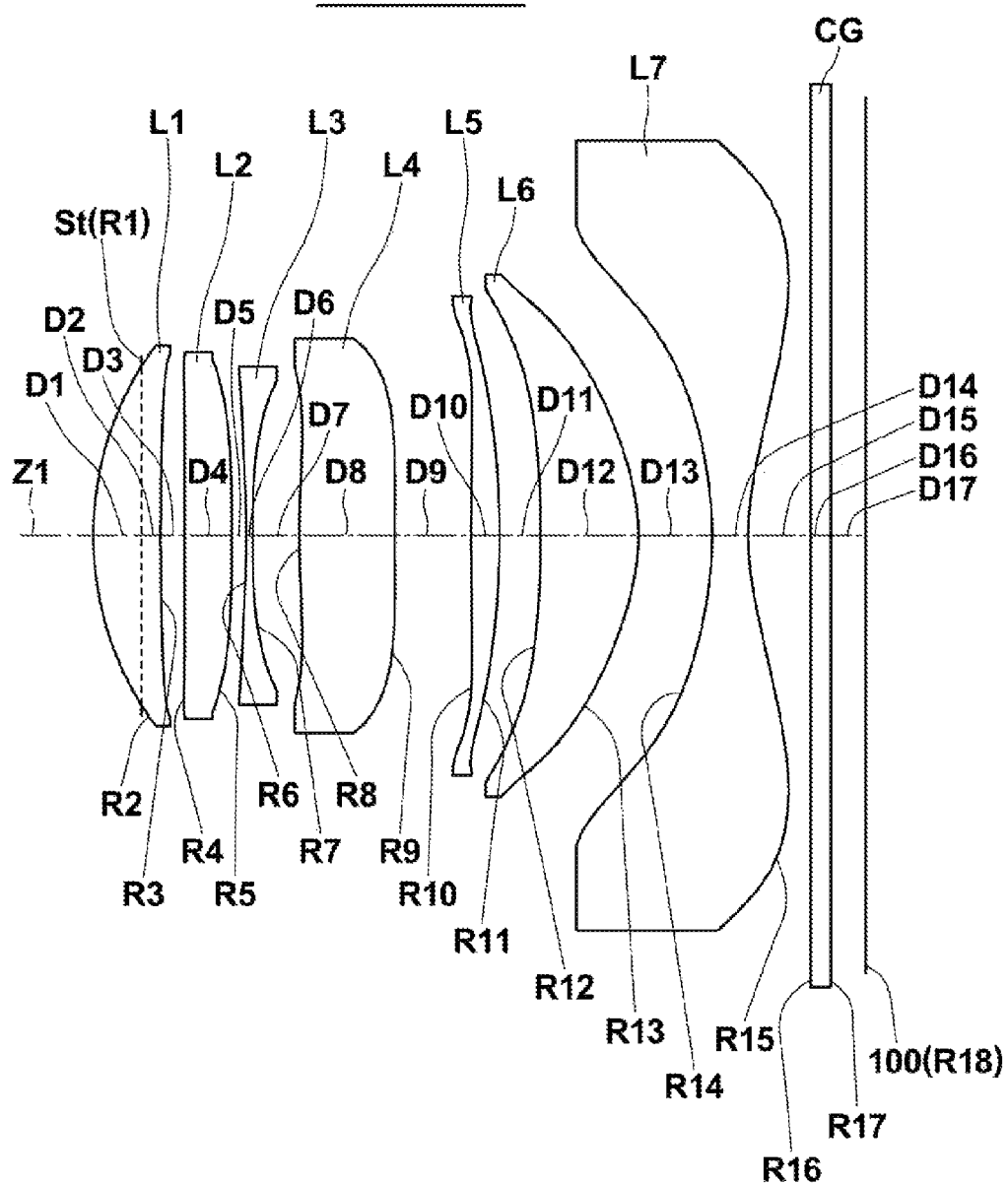
FIG. 7 is a diagram illustrating a seventh structural example of an imaging lens according to an embodiment of the present invention, and which is a lens cross section corresponding to Example 7.

In a similar manner to the imaging lens of Example 1, as described above, Table 3 and Table 4 show, as Example 2, specific lens data corresponding to the structure of an imaging lens illustrated in FIG. 2. Similarly, Table 5 through Table 14 show, as Example 3 through Example 7, specific lens data corresponding the structure of imaging lenses illustrated in FIG. 3 through FIG. 7. In the imaging lenses of Examples 1 through 7, both surfaces of all of first lens L1 through seventh lens L7 are aspherical.

Figure 9:
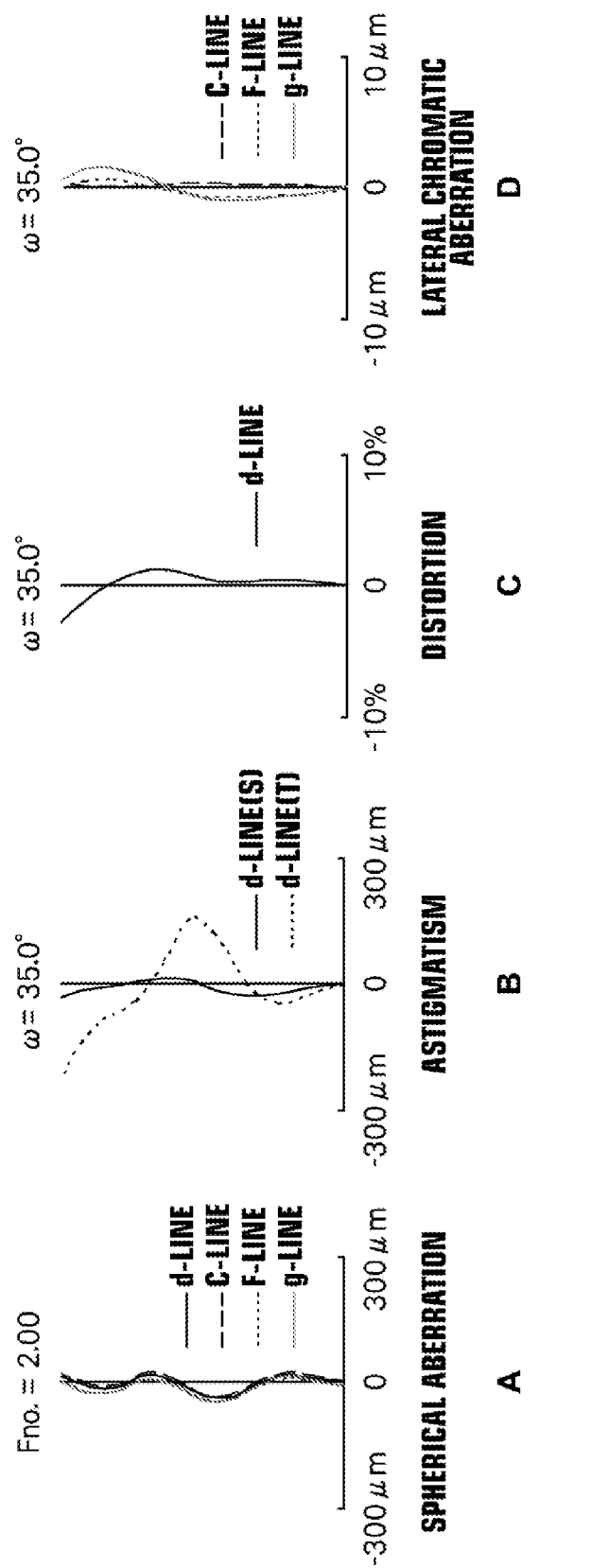
FIG. 9 is an aberration diagram illustrating various aberrations of an imaging lens in Example 1 of the present invention, and Section A shows a spherical aberration, and Section B shows astigmatism (curvature of field), and Section C shows distortion, and Section D shows a lateral chromatic aberration.

FIG. 9, Section A through Section D illustrate a spherical aberration, astigmatism, distortion (a distortion aberration) and a lateral chromatic aberration (a chromatic aberration of magnification) in the imaging lens of Example 1, respectively. Each aberration diagram illustrating a spherical aberration, astigmatism (curvature of field and distortion (a distortion aberration) illustrates an aberration when d-line (wavelength 587.56 nm) is a reference wavelength. The diagram of a spherical aberration and the diagram of a lateral chromatic aberration illustrate also aberrations for F-line (wavelength 486.1 nm) and C-line (wavelength 656.27 nm). In the aberration diagram of the spherical aberration, an aberration for g-line (wavelength is 435.83 nm) is also illustrated. In the diagram of astigmatism, an aberration in sagittal direction (S) is indicated by a solid line, and an aberration in tangential direction (T) is indicated by a broken line. Further, Fno. represents an F-number, and ω represents a half angle of view.

Figure 10:
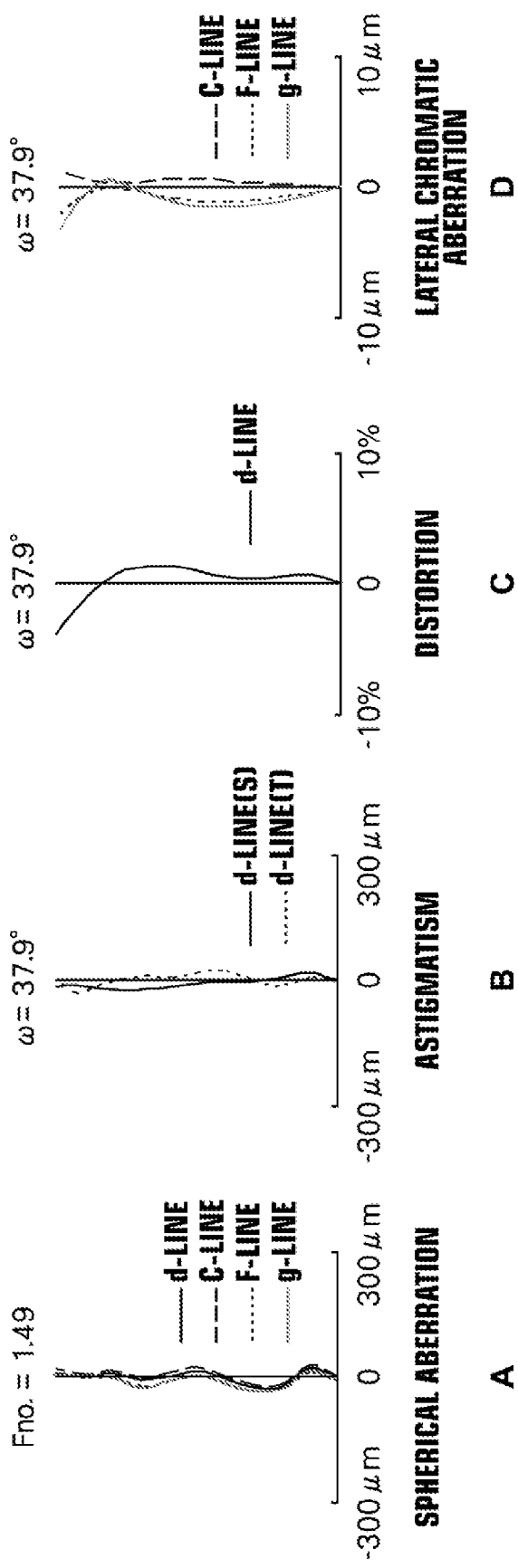
FIG. 10 is an aberration diagram illustrating various aberrations of an imaging lens in Example 2 of the present invention, and Section A shows a spherical aberration, and Section B shows astigmatism (curvature of field), and Section C shows distortion, and Section D shows a lateral chromatic aberration.
Figure 11:
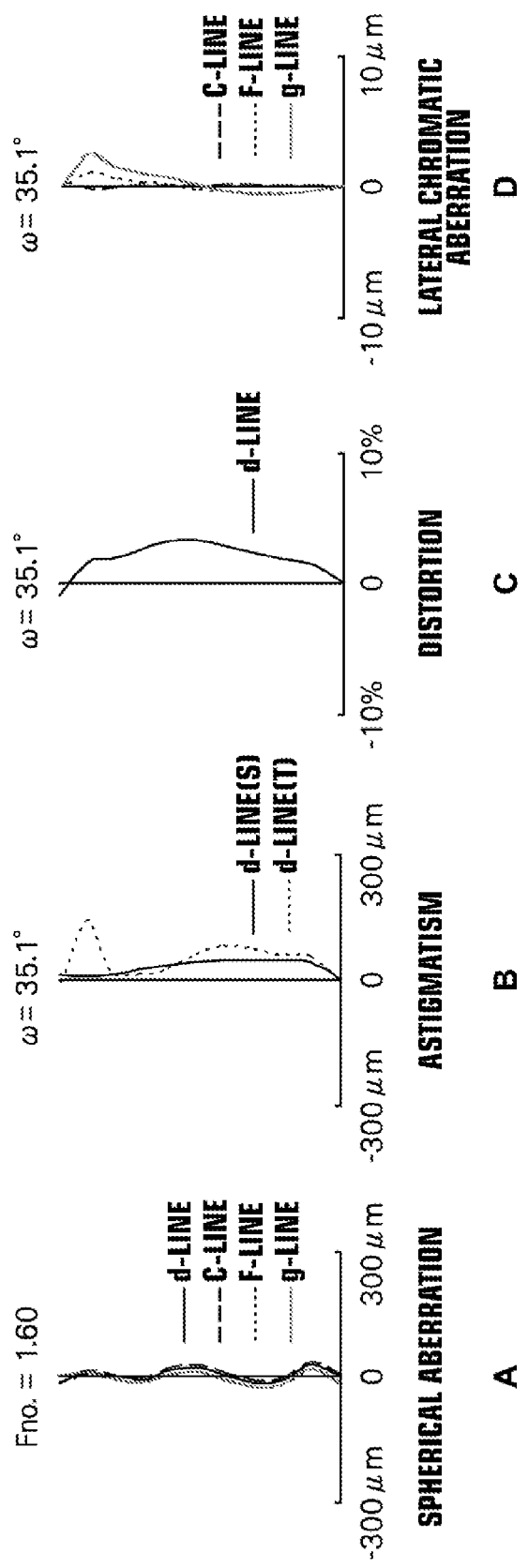
FIG. 11 is an aberration diagram illustrating various aberrations of an imaging lens in Example 3 of the present invention, and Section A shows a spherical aberration, and Section B shows astigmatism (curvature of field), and Section C shows distortion, and Section D shows a lateral chromatic aberration.
Figure 12:
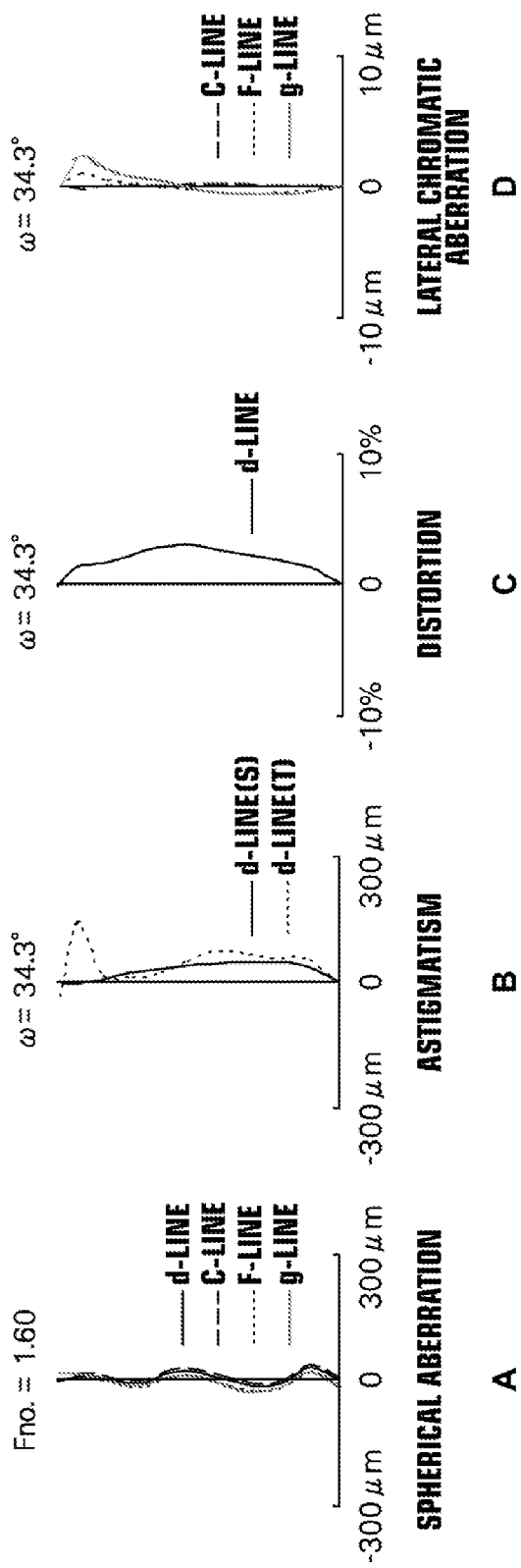
FIG. 12 is an aberration diagram illustrating various aberrations of an imaging lens in Example 4 of the present invention, and Section A shows a spherical aberration, and Section B shows astigmatism (curvature of field), and Section C shows distortion, and Section D shows a lateral chromatic aberration.
Figure 13:
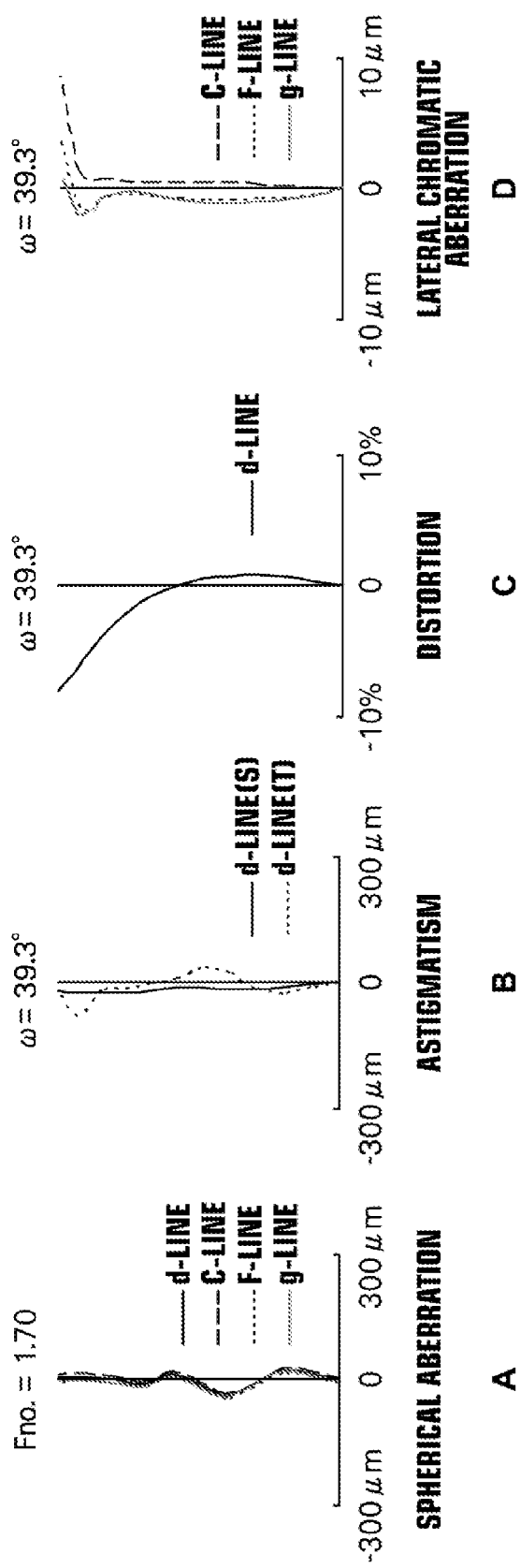
FIG. 13 is an aberration diagram illustrating various aberrations of an imaging lens in Example 5 of the present invention, and Section A shows a spherical aberration, and Section B shows astigmatism (curvature of field), and Section C shows distortion, and Section D shows a lateral chromatic aberration.
Figure 14:
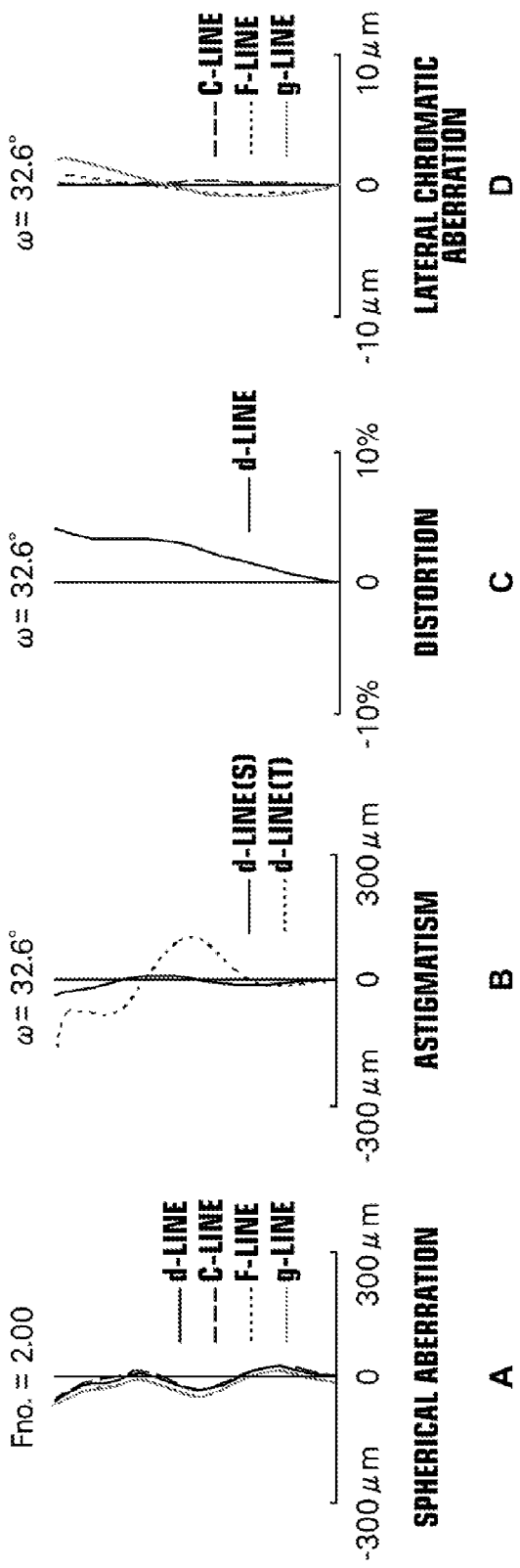
FIG. 14 is an aberration diagram illustrating various aberrations of an imaging lens in Example 6 of the present invention, and Section A shows a spherical aberration, and Section B shows astigmatism (curvature of field), and Section C shows distortion, and Section D shows a lateral chromatic aberration.
Figure 15:
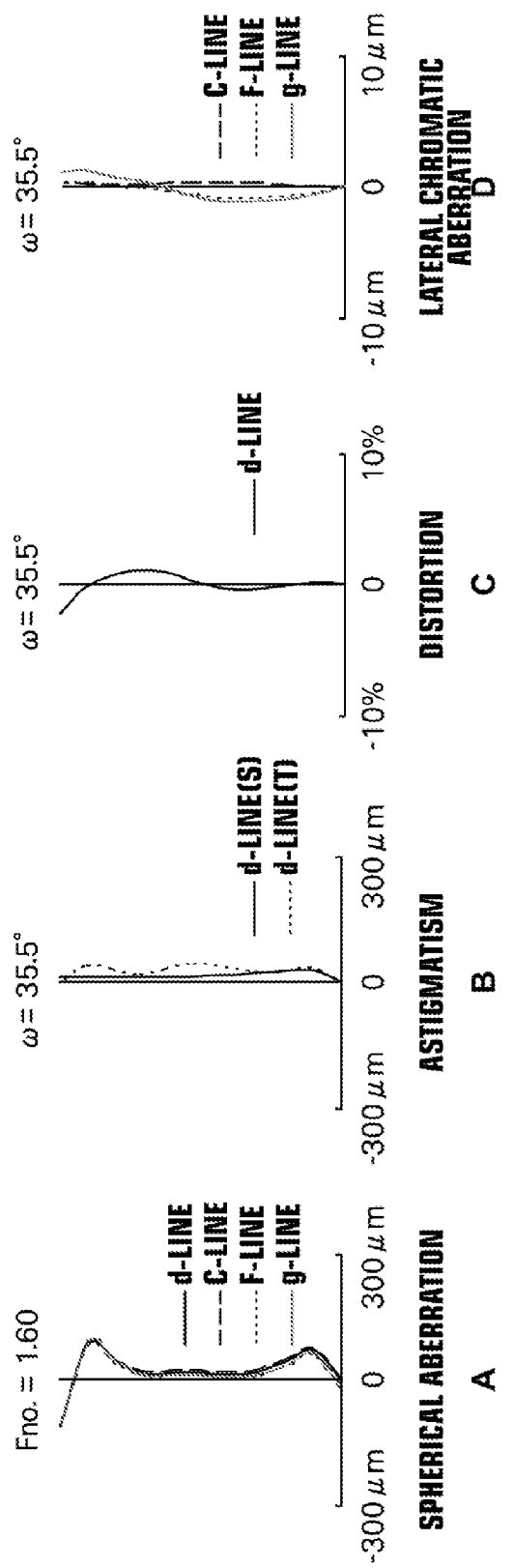
FIG. 15 is an aberration diagram illustrating various aberrations of an imaging lens in Example 7 of the present invention, and Section A shows a spherical aberration, and Section B shows astigmatism (curvature of field), and Section C shows distortion, and Section D shows a lateral chromatic aberration.

Similarly, FIG. 10, Section A through Section D through FIG. 15, Section A through Section D illustrate various aberrations in the imaging lenses of Example 2 through Example 7.

Further, Table 15 collectively shows values about conditional formulas (1) through (9) according to the present invention for Examples 1 through 7.

As the numerical value data and the aberration diagrams show, each example achieves a small F-number and high image formation performance while reducing the total length.

The imaging lens of the present invention is not limited to the aforementioned embodiments nor examples, and various modifications are possible. For example, values of a curvature radius, a distance between surfaces, a refractive index, an Abbe number and an aspherical coefficient of each lens element are not limited to the values in the aforementioned examples of numerical values, but may be other values.

In the description of each of all the examples, use of the imaging lens with fixed focus is assumed. Alternatively, the imaging lens may be structured in such a manner that focus is adjustable. For example, the imaging lens may be structured in such a manner that autofocusing is possible by extending the entire lens system, or by moving, on an optical axis, a part of lenses.

TABLE 1

EXAMPLE 1
f = 4.192, Bf = 0.673

| Si | Ri | Di | Ndj | ν dj |
|---|---|---|---|---|
| *1 | 2.4097 | 0.332 | 1.544884 | 54.87 |
| *2 | 3.6659 | 0.160 | | |
| 3(APERTURE STOP) | ∞ | 0.037 | | |
| *4 | 3.2523 | 0.453 | 1.544884 | 54.87 |
| *5 | −11.3504 | 0.158 | | |
| *6 | −4.3822 | 0.185 | 1.633506 | 23.63 |
| *7 | 15.4577 | 0.513 | | |
| *8 | 6.9257 | 0.534 | 1.544884 | 54.87 |
| *9 | 35.2826 | 0.471 | | |
| *10 | 8.3687 | 0.465 | 1.544884 | 54.87 |
| *11 | −4.8922 | 0.348 | | |
| *12 | −3.7463 | 0.460 | 1.544884 | 54.87 |
| *13 | −1.7354 | 0.508 | | |
| *14 | −1.7787 | 0.192 | 1.544884 | 54.87 |
| *15 | 3.1154 | 0.291 | | |
| 16 | ∞ | 0.145 | 1.516330 | 64.14 |
| 17 | ∞ | 0.286 | | |
| 18 | ∞ | | | |

*ASPHERICAL SURFACE

TABLE 2

EXAMPLE 1·ASPHERICAL SURFACE DATA

| SURFACE NUMBER | KA | A4 | A6 | A8 | A10 |
|---|---|---|---|---|---|
| 1 | −3.15500336E−01 | −3.90490748E−02 | 3.21740409E−01 | −1.02592962E+00 | 1.86531671E+00 |
| 2 | 4.79319898E−01 | −7.28640369E−03 | 1.22022400E−03 | 1.28744597E−03 | 1.84380512E−04 |
| 4 | 1.06897140E+00 | −1.80773539E−02 | −5.44788963E−03 | −3.00272042E−03 | −1.97945657E−04 |
| 5 | −6.39291121E+02 | −1.17177598E−01 | 5.96726877E−01 | −1.82701967E+00 | 3.24348127E+00 |
| 6 | 1.20393163E+01 | 1.62630880E−01 | −4.08930615E−01 | 1.15150218E+00 | −2.31472994E+00 |
| 7 | 1.72925310E+02 | 2.36070619E−01 | −1.51701946E+00 | 6.32724858E+00 | −1.63976616E+01 |
| 8 | 2.57869114E+01 | 4.24350114E−02 | −6.92441980E−01 | 2.27404043E+00 | −4.53394073E+00 |
| 9 | 2.58133088E+02 | −7.74529589E−02 | 1.48833837E−01 | −5.56541852E−01 | 1.03200504E+00 |
| 10 | 9.88971551E−01 | 1.93846067E−02 | −5.20767382E−02 | 8.81312041E−02 | −1.05322932E−01 |
| 11 | 1.62706797E+00 | 1.56660263E−02 | 1.94028945E−02 | −3.24841639E−02 | 2.60649064E−02 |
| 12 | 4.52025275E−01 | 4.33586570E−03 | −4.89745140E−02 | 5.24569387E−02 | −4.15870119E−02 |
| 13 | −3.72782483E−02 | 1.57663757E−01 | −2.75699042E−01 | 3.03200379E−01 | −2.13261398E−01 |

| | A12 | A14 | A16 | A18 | A20 |
|---|---|---|---|---|---|
| 1 | −2.04007525E+00 | 1.36555968E+00 | −5.46404595E−01 | 1.20030217E−01 | −1.12293647E−02 |
| 2 | −1.68636461E−04 | −1.68916074E−04 | −8.12337899E−05 | 2.25165169E−05 | 7.70234255E−05 |
| 4 | 4.31800553E−04 | 3.30119106E−04 | 1.18430048E−04 | −3.40733567E−05 | −1.06659936E−04 |
| 5 | −3.57993597E+00 | 2.48470414E+00 | −1.05645063E+00 | 2.51181048E−01 | −2.52663592E−02 |
| 6 | 3.06116828E+00 | −2.59062323E+00 | 1.34815542E+00 | −3.90999000E−01 | 4.90099049E−02 |
| 7 | 2.66612767E+01 | −2.72670431E+01 | 1.70235836E+01 | −5.92469943E+00 | 8.81518332E−01 |
| 8 | 5.63819204E+00 | −4.42500884E+00 | 2.12973975E+00 | −5.73116242E−01 | 6.62270757E−02 |
| 9 | −1.15419401E+00 | 8.00371028E−01 | −3.37775491E−01 | 7.96232723E−02 | −7.97299719E−03 |
| 10 | 7.06371445E−02 | −2.85593488E−02 | 6.79999654E−03 | −8.91420463E−04 | 5.29623645E−05 |
| 11 | −1.57218013E−02 | 6.04165825E−03 | −1.38957345E−03 | 1.82155824E−04 | −1.06954112E−05 |
| 12 | 2.24578832E−02 | −7.49905773E−03 | 1.52526085E−03 | −1.75509797E−04 | 8.70552473E−06 |
| 13 | 9.61572253E−02 | −2.74866120E−02 | 4.81243967E−03 | −4.69506080E−04 | 1.94503794E−05 |

| SURFACE NUMBER | KA | A3 | A4 | A5 | A6 |
|---|---|---|---|---|---|
| 14 | 4.75730027E−01 | 2.12156144E−02 | 9.18004513E−02 | −3.34245479E−01 | 6.39236396E−01 |
| 15 | −9.95061310E+00 | 7.00400812E−02 | −3.26086026E−01 | 4.05108614E−01 | −3.69208213E−01 |

| SURFACE NUMBER | A7 | A8 | A9 | A10 | A11 |
|---|---|---|---|---|---|
| 14 | −9.69485777E−01 | 1.19793895E+00 | −1.12828667E+00 | 7.78370948E−01 | −3.85650973E−01 |
| 15 | 3.84570792E−01 | −4.15302455E−01 | 3.55146724E−01 | −2.21475792E−01 | 9.92520263E−02 |

| SURFACE NUMBER | A12 | A13 | A14 | A15 | A16 |
|---|---|---|---|---|---|
| 14 | 1.35484668E−01 | −3.29787498E−02 | 5.27372555E−03 | −4.92056991E−04 | 1.95189710E−05 |
| 15 | −3.15881218E−02 | 6.98658445E−03 | −1.02915427E−03 | 9.10103601E−05 | −3.55135103E−06 |

| SURFACE NUMBER | A17 | A18 | A19 | A20 | |
|---|---|---|---|---|---|
| 14 | −1.98508577E−08 | 5.48921372E−09 | 6.42427337E−09 | 5.18587471E−09 | |
| 15 | 2.05216064E−09 | 1.33146895E−09 | 2.07404490E−10 | 1.78383609E−11 | |

TABLE 3

EXAMPLE 2
f = 4.234, Bf = 0.696

| Si | Ri | Di | Ndj | νdj |
|---|---|---|---|---|
| 1(APERTURE STOP) | ∞ | −0.249 | | |
| *2 | 2.4405 | 0.356 | 1.544884 | 54.87 |
| *3 | 3.7608 | 0.075 | | |
| *4 | 3.3343 | 0.514 | 1.544884 | 54.87 |
| *5 | −18.6607 | 0.103 | | |
| *6 | −4.7980 | 0.118 | 1.633506 | 23.63 |
| *7 | 16.4808 | 0.491 | | |
| *8 | 6.9094 | 0.557 | 1.544884 | 54.87 |
| *9 | 49.3307 | 0.508 | | |
| *10 | 9.1896 | 0.463 | 1.544884 | 54.87 |
| *11 | −4.9908 | 0.394 | | |
| *12 | −3.8333 | 0.482 | 1.544884 | 54.87 |
| *13 | −1.7050 | 0.518 | | |
| *14 | −1.7764 | 0.224 | 1.544884 | 54.87 |
| *15 | 3.0318 | 0.298 | | |
| 16 | ∞ | 0.145 | 1.516330 | 64.14 |
| 17 | ∞ | 0.302 | | |
| 18 | ∞ | | | |

*ASPHERICAL SURFACE

TABLE 4

EXAMPLE 2·ASPHERICAL SURFACE DATA

| SURFACE NUMBER | KA | A4 | A6 | A8 | A10 |
|---|---|---|---|---|---|
| 3 | 4.80324149E−01 | −6.37702589E−03 | 2.11362063E−03 | 2.13035366E−04 | −2.62426002E−04 |
| 4 | 1.06386551E+00 | −2.25330385E−02 | −6.72548681E−03 | −1.56039509E−03 | 3.51543351E−04 |

| | A12 | A14 | A16 | A18 | A20 |
|---|---|---|---|---|---|
| 3 | −1.55143054E−04 | −7.26747508E−05 | −4.64361348E−05 | −8.73540901E−06 | −7.91612984E−07 |
| 4 | 3.56457896E−04 | 1.57651398E−04 | 5.47436555E−05 | 1.40390904E−05 | 1.09577961E−06 |

| SURFACE NUMBER | KA | A3 | A4 | A5 | A6 |
|---|---|---|---|---|---|
| 2 | −3.11307362E−01 | −4.57334786E−02 | 3.02359412E−01 | −1.36353373E+00 | 6.52239885E+00 |
| 5 | −6.37708888E+02 | −5.75179955E−02 | 1.91398066E−01 | −2.45970401E−01 | −2.66473935E−01 |
| 6 | 1.20412974E+01 | −4.64953437E−03 | 2.63410593E−01 | −5.62953310E−01 | 7.49782158E−01 |
| 7 | 1.72920588E+02 | 4.86737159E−02 | 1.33440630E−02 | 4.30248059E−02 | −1.69182532E+00 |
| 8 | 2.57872954E+01 | 2.78906496E−03 | 1.53205239E−01 | −8.75395649E−01 | 1.31298251E+00 |
| 9 | 2.61458916E+02 | −2.73597304E−03 | −1.21959465E−01 | 8.74851100E−01 | −4.41850678E+00 |
| 10 | 9.89550536E−01 | 1.07835283E−03 | 5.85224503E−03 | 1.96417121E−01 | −1.21121450E+00 |
| 11 | 1.62756730E+00 | −1.06139195E−03 | 1.75718211E−02 | 6.19116926E−03 | −3.37614791E−05 |
| 12 | 4.51265061E−01 | 4.02470705E−03 | −7.01062588E−03 | −1.00045275E−02 | −4.98447356E−03 |
| 13 | −4.55837887E−02 | 3.61702764E−02 | 1.15643426E−01 | −3.10760491E−01 | 8.67862154E−01 |
| 14 | 4.85681712E−01 | 2.03442322E−02 | 9.14446126E−01 | −3.34411206E+00 | 6.39195179E−01 |
| 15 | −9.95274444E+00 | 6.54035572E−02 | −3.25806588E−01 | 4.05545521E−01 | −3.69067285E−01 |

| | A7 | A8 | A9 | A10 | A11 |
|---|---|---|---|---|---|
| 2 | −2.69322004E+01 | 8.23149757E+01 | −1.81240956E+02 | 2.90745311E+02 | −3.42827233E+02 |
| 5 | 1.10161062E+00 | −9.15715653E−01 | −2.79600989E−01 | 5.83887576E−01 | −6.19651131E−02 |
| 6 | −2.33053209E−01 | −7.91483685E−01 | 9.73155961E−01 | −2.25313831E−01 | 3.98009582E−03 |
| 7 | 1.07606564E+01 | −3.69337524E+01 | 8.28292754E+01 | −1.31681853E+02 | 1.53448898E+02 |
| 8 | −3.91767019E−01 | −1.24123231E+00 | 1.48126344E+00 | −3.62749358E−01 | −1.79256982E−01 |
| 9 | 1.42466782E+00 | −3.28913965E+01 | 5.56606171E+01 | −6.94644285E+01 | 6.36940053E+01 |
| 10 | 3.79048672E+00 | −7.79235628E+00 | 1.14819393E+01 | −1.25021468E+01 | 1.00437589E+01 |
| 11 | −3.01490603E−03 | −1.81273476E−03 | −8.30917239E−04 | −2.77688266E−04 | −1.67534596E−05 |
| 12 | −8.04493229E−04 | 6.93844458E−04 | 7.88719480E−04 | 4.18057255E−04 | 1.49309453E−04 |
| 13 | −2.21858069E+00 | 4.00607428E+00 | −5.12177312E+00 | 4.78514277E+00 | −3.30161872E+00 |
| 14 | −9.69492977E−01 | 1.19793801E+00 | −1.12828658E+00 | 7.78371115E−01 | −3.85650835E−01 |
| 15 | 3.84610139E−01 | −4.15292575E−01 | 3.55149389E−01 | −2.21475205E−01 | 9.92521499E−02 |

| | A12 | A13 | A14 | A15 | A16 |
|---|---|---|---|---|---|
| 2 | 2.95570604E+02 | −1.81603190E+02 | 7.51960538E+01 | −1.87348377E+01 | 2.11141212E+00 |
| 5 | 2.79603157E−01 | −7.83955506E−01 | 6.09829143E−01 | −1.93875157E−01 | 2.17174061E−02 |
| 6 | −3.23124887E−01 | 2.28380534E−01 | 6.29053211E−02 | −9.65023707E−02 | 2.40312314E−02 |
| 7 | −1.31088183E+02 | 7.98789255E−01 | −3.27582203E+01 | 8.06391116E+00 | −8.94091468E−01 |
| 8 | −2.22116267E−01 | 4.48689281E−01 | −2.26658903E−01 | 3.35517837E−02 | 2.90630582E−03 |
| 9 | −4.22846101E+01 | 1.97316866E+01 | −6.13263578E+00 | 1.14140965E+00 | −9.64126058E−02 |
| 10 | −5.88184805E+00 | 2.45487695E+00 | −6.96507667E−01 | 1.20750321E−01 | −9.66815895E−03 |
| 11 | 3.10122838E−05 | 3.48153352E−05 | 1.80537242E−05 | 1.18380026E−05 | 4.45597657E−06 |
| 12 | 2.59526331E−05 | −2.50688201E−06 | −7.09091538E−06 | −4.73267020E−06 | −5.79695311E−06 |
| 13 | 1.66128461E+00 | −5.89168455E−01 | 1.38841331E−01 | −1.95786843E−02 | 1.28588885E−03 |
| 14 | 1.35484760E−01 | −3.29786953E−02 | 5.27375637E−03 | −4.92040851E−04 | 1.95272013E−05 |
| 15 | −3.15881170E−02 | 6.98657701E−03 | −1.02915921E−03 | 9.10069522E−05 | −3.55286524E−06 |

TABLE 4-continued

EXAMPLE 2·ASPHERICAL SURFACE DATA

|   | A17 | A18 | A19 | A20 |
|---|---|---|---|---|
| 2 | −9.21611123E−06 | 5.22448960E−07 | 6.16338003E−06 | −6.59302075E−06 |
| 5 | −2.31281563E−05 | −1.92498745E−05 | 6.84424928E−06 | 2.96932137E−05 |
| 6 | 4.00192794E−05 | 2.56091798E−05 | 2.08688337E−06 | 1.48960772E−05 |
| 7 | 1.08040060E−04 | 1.27299022E−04 | 1.17513318E−04 | 1.36799533E−04 |
| 8 | 2.29131430E−05 | 2.26977325E−05 | 5.56665569E−06 | −4.76994732E−05 |
| 9 | 1.37918125E−05 | 1.54463696E−06 | −7.96373418E−06 | 2.03445108E−05 |
| 10 | −1.24985129E−05 | 2.20575971E−05 | −2.04784424E−06 | −1.62145852E−06 |
| 11 | 1.79984726E−06 | 3.68287935E−07 | −3.49991951E−07 | −2.59055259E−07 |
| 12 | −7.52675910E−07 | −8.35386564E−08 | 6.75932418E−08 | 8.37861767E−08 |
| 13 | −4.73800602E−08 | −3.57592914E−07 | −3.43093425E−07 | −2.48343316E−07 |
| 14 | −1.59289464E−08 | 8.13379660E−09 | 7.23390798E−09 | 5.53891961E−09 |
| 15 | 1.56611515E−09 | 1.09919033E−09 | 1.27284588E−10 | −1.43118707E−11 |

TABLE 5

EXAMPLE 3
f = 4.207, Bf = 0.661

| Si | Ri | Di | Ndj | νdj |
|---|---|---|---|---|
| 1(APERTURE STOP) | ∞ | −0.249 | | |
| *2 | 1.9180 | 0.349 | 1.544884 | 54.87 |
| *3 | 3.7084 | 0.046 | | |
| *4 | 3.1940 | 0.413 | 1.544884 | 54.87 |
| *5 | 22.1514 | 0.158 | | |
| *6 | −5.0950 | 0.100 | 1.633506 | 23.63 |
| *7 | 15.3065 | 0.419 | | |
| *8 | 6.7920 | 0.411 | 1.544884 | 54.87 |
| *9 | 20.6463 | 0.743 | | |
| *10 | 11.0304 | 0.555 | 1.544884 | 54.87 |
| *11 | −4.3987 | 0.074 | | |
| *12 | −5.6398 | 0.709 | 1.544884 | 54.87 |
| *13 | −1.7848 | 0.301 | | |
| *14 | −1.8027 | 0.390 | 1.544884 | 54.87 |
| *15 | 3.2719 | 0.301 | | |
| 16 | ∞ | 0.145 | 1.516330 | 64.14 |
| 17 | ∞ | 0.264 | | |
| 18 | ∞ | | | |

*ASPHERICAL SURFACE

TABLE 6

EXAMPLE 3·ASPHERICAL SURFACE DATA

| SURFACE NUMBER | KA | A4 | A6 | A8 | A10 |
|---|---|---|---|---|---|
| 3 | 2.28182500E−01 | −2.99784670E−03 | 4.40442540E−04 | −4.17582320E−05 | −1.08572070E−04 |
| 4 | 1.09891416E+00 | 5.61697820E−04 | −1.17936220E−03 | −2.96165350E−04 | −4.09169170E−05 |

| | A12 | A14 | A16 | A18 | A20 |
|---|---|---|---|---|---|
| 3 | −7.35906490E−05 | −3.38858440E−05 | −1.55495760E−05 | −5.09608960E−06 | −1.14891470E−06 |
| 4 | 3.75970050E−06 | 1.29876150E−05 | 8.24960690E−06 | 6.27158790E−06 | 4.89374540E−06 |

| SURFACE NUMBER | KA | A3 | A4 | A5 | A6 |
|---|---|---|---|---|---|
| 2 | −3.33033000E−01 | −3.68303670E−02 | 3.03072470E−01 | −1.36241330E+00 | 6.52432340E+00 |
| 5 | −2.17063000E+02 | −4.84113200E−02 | 1.97565630E−01 | −2.42593790E−01 | −2.65595960E−01 |
| 6 | 1.20474400E+01 | 6.20942880E−04 | 2.65538150E−01 | −5.62306930E−01 | 7.52803550E−01 |
| 7 | 1.49730700E+02 | 6.22771760E−02 | 1.69573700E−02 | 5.68584910E−02 | −1.68066450E+00 |
| 8 | 2.56443100E+01 | −6.91304080E−03 | 1.51483750E−01 | −8.75361200E−01 | 1.32029780E+00 |
| 9 | 2.53719400E+02 | −1.56511380E−02 | −1.13222530E−01 | 8.86169920E−01 | −4.41399140E+00 |
| 10 | 1.00000000E+00 | 9.51395730E−03 | −1.20041970E−02 | 1.88470060E−01 | −1.20575420E+00 |
| 11 | 1.41155950E+00 | 1.70226510E−02 | 5.91299110E−04 | 1.92501450E−03 | 1.26257600E−03 |
| 12 | 6.47425400E−01 | −8.18458250E−03 | 7.35878910E−04 | −1.95705540E−03 | −3.95729130E−04 |
| 13 | 1.06011500E+00 | 5.62841460E−02 | 1.00089670E−01 | −3.06462000E−01 | 8.70781450E−01 |
| 14 | 4.68411900E−01 | 4.42920900E−02 | 8.96060150E−02 | −3.36499780E−01 | 6.37873330E−01 |
| 15 | −2.95342000E+00 | 7.53913700E−02 | −3.24023710E−01 | 4.04372620E−01 | −3.69927830E−01 |

| | A7 | A8 | A9 | A10 | A11 |
|---|---|---|---|---|---|
| 2 | −2.69314800E+01 | 8.23147640E+01 | −1.81241340E+02 | 2.90744850E+02 | −3.42827510E+02 |
| 5 | 1.10158670E+00 | −9.15716200E−01 | −2.79520550E−01 | 5.83970450E−01 | −6.19012180E−02 |
| 6 | −2.30376420E−01 | −7.89845930E−01 | 9.73890090E−01 | −2.25010680E−01 | 4.10049190E−03 |
| 7 | 1.07588310E+00 | −3.69340320E−01 | 8.28305610E+01 | −1.31679370E+02 | 1.53449140E+02 |
| 8 | −3.89578940E−01 | −1.24081590E+00 | 1.48099690E+00 | −3.62398100E+00 | −1.78475480E+00 |
| 9 | 1.42499530E+01 | −3.28895900E+01 | 5.56613590E+01 | −6.94637020E+01 | 6.36942910E+01 |
| 10 | 3.79669180E+00 | −7.78900170E+00 | 1.14821130E+01 | −1.25024720E+01 | 1.00431990E+01 |
| 11 | 3.86472980E−04 | 1.41788010E−05 | −5.20678730E−05 | −1.66100430E−05 | 4.70101300E−06 |
| 12 | 3.30511450E−04 | 4.50872540E−04 | 3.09773600E−04 | 1.48895910E−04 | 4.88329850E−05 |
| 13 | −2.21933690E+00 | 4.00566130E+00 | −5.12197660E+00 | 4.78505270E+00 | −3.30165330E+00 |

TABLE 6-continued

EXAMPLE 3·ASPHERICAL SURFACE DATA

| | | | | | |
|---|---|---|---|---|---|
| 14 | −9.69836460E−01 | 1.19787910E+00 | −1.12827390E+00 | 7.78387360E−01 | −3.85642100E−01 |
| 15 | 3.84367950E−01 | −4.15286960E−01 | 3.55164770E−01 | −2.21461400E−01 | 9.92572580E−02 |

| | A12 | A13 | A14 | A15 | A16 |
|---|---|---|---|---|---|
| 2 | 2.95570560E+02 | −1.81603160E+02 | 7.51960920E+01 | −1.87347980E+01 | 2.11142860E+00 |
| 5 | 2.79603280E−01 | −7.83980060E−01 | 6.09799260E−01 | −1.93906540E−01 | 2.16807990E−02 |
| 6 | −3.23103460E−01 | 2.28380650E−01 | 6.29015710E−02 | −9.65188080E−02 | 2.40117830E−02 |
| 7 | −1.31088470E+02 | 7.98789320E+01 | −3.27583800E+01 | 8.06402930E+00 | −8.94183560E−01 |
| 8 | −2.21789520E−01 | 4.48843670E−01 | −2.26681190E−01 | 3.35800030E−02 | 2.92979160E−03 |
| 9 | −4.22843600E+01 | 1.97316830E+01 | −6.13269760E+00 | 1.14135180E+00 | −9.64552080E−02 |
| 10 | −5.88222340E+00 | 2.45505560E+00 | −6.96325260E−01 | 1.20754290E−01 | −9.65622820E−03 |
| 11 | 9.70303290E−06 | 7.27327490E−06 | 3.49426030E−06 | 1.46139210E−06 | 2.48484800E−07 |
| 12 | 2.74128170E−06 | −2.71874560E−06 | −3.68516660E−06 | −2.40127500E−06 | −1.24844750E−06 |
| 13 | 1.66127270E+00 | −5.89171210E−01 | 1.38842330E−01 | −1.95784210E−02 | 1.28616370E−03 |
| 14 | 1.35489540E−01 | −3.29767300E−02 | 5.27452500E−03 | −4.91677590E−04 | 1.95871220E−05 |
| 15 | −3.15868970E−02 | 6.98678310E−03 | −1.02919410E−03 | 9.09719780E−05 | −3.57059970E−06 |

| | A17 | A18 | A19 | A20 |
|---|---|---|---|---|
| 2 | 2.70563510E−06 | 1.29282980E−06 | 2.59412160E−06 | −1.04155460E−05 |
| 5 | −4.49863420E−05 | −2.41788920E−05 | 1.05635920E−06 | 2.45206290E−05 |
| 6 | 1.61620030E−05 | 2.05838670E−06 | −2.40569650E−05 | −3.71824400E−06 |
| 7 | 7.35953500E−05 | 1.39806450E−04 | 1.93702330E−04 | 2.18908010E−04 |
| 8 | 1.33439550E−05 | −1.27254560E−05 | −3.36537390E−05 | −4.82474600E−05 |
| 9 | −1.44559330E−05 | −1.22678990E−05 | 1.00219970E−06 | 7.63225730E−06 |
| 10 | −6.65290300E−07 | −4.79218730E−08 | 1.80518140E−07 | 2.90932100E−07 |
| 11 | −2.28214370E−08 | −1.99576590E−07 | −2.35779250E−07 | −1.78179610E−07 |
| 12 | −5.82558640E−07 | −1.72045600E−07 | −3.07638950E−08 | 8.30584240E−09 |
| 13 | 1.64225840E−07 | −2.23382360E−07 | −2.70060280E−07 | −2.14848160E−07 |
| 14 | −3.12498400E−08 | −1.31970460E−08 | −5.61330950E−09 | −2.34778860E−09 |
| 15 | −3.08865860E−09 | −4.72017530E−10 | 7.33886540E−11 | 1.25723340E−10 |

TABLE 7

EXAMPLE 4
f = 4.180, Bf = 0.628

| Si | Ri | Di | Ndj | ν dj |
|---|---|---|---|---|
| 1(APERTURE STOP) | ∞ | −0.249 | | |
| *2 | 1.9173 | 0.349 | 1.544884 | 54.87 |
| *3 | 3.7120 | 0.046 | | |
| *4 | 3.1931 | 0.414 | 1.544884 | 54.87 |
| *5 | 23.0504 | 0.158 | | |
| *6 | −5.0948 | 0.100 | 1.633506 | 23.63 |
| *7 | 15.3048 | 0.418 | | |
| *8 | 6.7924 | 0.412 | 1.544884 | 54.87 |
| *9 | 20.6466 | 0.743 | | |
| *10 | 11.0218 | 0.555 | 1.544884 | 54.87 |
| *11 | −4.3985 | 0.075 | | |
| *12 | −5.6409 | 0.710 | 1.544884 | 54.87 |
| *13 | −1.7842 | 0.303 | | |
| *14 | −1.8031 | 0.404 | 1.544884 | 54.87 |
| *15 | 3.1609 | 0.298 | | |
| 16 | ∞ | 0.145 | 1.516330 | 64.14 |
| 17 | ∞ | 0.234 | | |
| 18 | ∞ | | | |

*ASPHERICAL SURFACE

TABLE 8

EXAMPLE 4·ASPHERICAL SURFACE DATA

| SURFACE NUMBER | KA | A4 | A6 | A8 | A10 |
|---|---|---|---|---|---|
| 3 | 2.28558129E−01 | −2.99569308E−03 | 4.43836712E−04 | −3.97347584E−05 | −1.07573798E−04 |
| 4 | 1.09806597E+00 | 6.50084626E−04 | −1.18594005E−03 | −2.99197015E−04 | −4.22295585E−05 |

| | A12 | A14 | A16 | A18 | A20 |
|---|---|---|---|---|---|
| 3 | −7.33876173E−05 | −3.36845357E−05 | −1.55132339E−05 | −5.05898074E−06 | −1.13314610E−06 |
| 4 | 3.20384178E−06 | 1.27545713E−05 | 8.15171592E−06 | 6.23048371E−06 | 4.87636148E−06 |

| SURFACE NUMBER | KA | A3 | A4 | A5 | A6 |
|---|---|---|---|---|---|
| 2 | −3.33065771E−01 | −3.68241847E−02 | 3.03071903E−01 | −1.36241595E+00 | 6.52432055E+00 |
| 5 | −2.16860335E+02 | −4.84058526E−02 | 1.97575125E−01 | −2.42585980E−01 | −2.65590365E−01 |
| 6 | 1.20482831E+01 | 6.54223118E−04 | 2.65538634E−01 | −5.62314360E−01 | 7.52795392E−01 |
| 7 | 1.49751354E+02 | 6.21652179E−02 | 1.69463416E−02 | 5.68555239E−02 | −1.68066381E+00 |
| 8 | 2.56418804E+01 | −6.89168837E−03 | 1.51486378E−01 | −8.75363292E−01 | 1.32029078E+00 |
| 9 | 2.53717986E+02 | −1.56902156E−02 | −1.13236432E−01 | 8.86149855E−01 | −4.41400028E+00 |
| 10 | 1.06334783E+00 | 9.56739722E−03 | −1.19895053E−02 | 1.88477511E−01 | −1.20575515E+00 |

TABLE 8-continued

EXAMPLE 4·ASPHERICAL SURFACE DATA

| | | | | | |
|---|---|---|---|---|---|
| 11 | 1.41154517E+00 | 1.70032951E−02 | 5.83243963E−04 | 1.93893049E−03 | 1.27597138E−03 |
| 12 | 6.50916778E−01 | −8.13437046E−03 | 7.41160685E−04 | −1.97685257E−03 | −4.12909453E−04 |
| 13 | 1.06065983E−01 | 5.62016508E−02 | 9.99281941E−02 | −3.06472575E−01 | 8.70755760E−01 |
| 14 | 4.67469453E−01 | 4.46074598E−02 | 8.96412697E−02 | −3.36454476E−01 | 6.37873330E−01 |
| 15 | −2.95356627E+00 | 7.53483191E−02 | −3.24028706E−01 | 4.04343897E−01 | −3.69928487E−01 |

| | A7 | A8 | A9 | A10 | A11 |
|---|---|---|---|---|---|
| 2 | −2.69314800E+01 | 8.23147640E+01 | −1.81241340E+02 | 2.90744850E+02 | −3.42827510E+02 |
| 5 | 1.10158670E+00 | −9.15716200E−01 | −2.79520550E−01 | 5.83970450E−01 | −6.19012180E−02 |
| 6 | −2.30376420E−01 | −7.89845930E−01 | 9.73890090E−01 | −2.25010680E−01 | 4.10049190E−03 |
| 7 | 1.07588310E+00 | −3.69340320E+01 | 8.28305610E+01 | −1.31679370E+02 | 1.53449140E+02 |
| 8 | −3.89578940E−01 | −1.24081590E+00 | 1.48099690E+00 | −3.62398100E−01 | −1.78475480E−01 |
| 9 | 1.42499530E+01 | −3.28895900E+01 | 5.56613590E+01 | −6.94637020E+01 | 6.36942910E+01 |
| 10 | 3.79669180E+00 | −7.78900170E+00 | 1.14821130E+01 | −1.25024720E+01 | 1.00431990E+01 |
| 11 | 3.86472980E−04 | 1.41788010E−05 | −5.20678730E−05 | −1.66100430E−05 | 4.70101300E−06 |
| 12 | 3.30511450E−04 | 4.50872540E−04 | 3.09773600E−04 | 1.48895910E−04 | 4.88329850E−05 |
| 13 | −2.21933690E+00 | 4.00566130E+00 | −5.12197660E+00 | 4.78505270E+00 | −3.30165330E+00 |
| 14 | −9.69836460E−01 | 1.19787910E+00 | −1.12827390E+00 | 7.78387360E−01 | −3.85642100E−01 |
| 15 | 3.84367950E−01 | −4.15286960E−01 | 3.55164770E−01 | −2.21461400E−01 | 9.92572580E−02 |

| | A12 | A13 | A14 | A15 | A16 |
|---|---|---|---|---|---|
| 2 | 2.95570560E+02 | −1.81603160E+02 | 7.51960920E+01 | −1.87347980E+01 | 2.11142860E+00 |
| 5 | 2.79603280E−01 | −7.83980060E−01 | 6.09799260E−01 | −1.93906540E−01 | 2.16807990E−02 |
| 6 | −3.23103460E−01 | 2.28380650E−01 | 6.29015710E−02 | −9.65188080E−02 | 2.40117830E−02 |
| 7 | −1.31088470E+02 | 7.98789320E+01 | −3.27583800E+01 | 8.06402930E+00 | −8.94183560E−01 |
| 8 | −2.21789520E−01 | 4.48843670E−01 | −2.26681190E−01 | 3.35800030E−02 | 2.92979160E−03 |
| 9 | −4.22843600E+01 | 1.97316830E+01 | −6.13269760E+00 | 1.14135180E+00 | −9.64552080E−02 |
| 10 | −5.88222340E+00 | 2.45505560E+00 | −6.96325260E−01 | 1.20754290E−01 | −9.65622820E−03 |
| 11 | 9.70303290E−06 | 7.27327490E−06 | 3.49426030E−06 | 1.46139210E−06 | 2.48484800E−07 |
| 12 | 2.74128170E−06 | −2.71874560E−06 | −3.68516660E−06 | −2.40127500E−06 | −1.24844750E−06 |
| 13 | 1.66127270E+00 | −5.89171210E−01 | 1.38842330E−01 | −1.95784210E−02 | 1.28616370E−03 |
| 14 | 1.35489540E−01 | −3.29767300E−02 | 5.27452500E−03 | −4.91677590E−04 | 1.95871220E−05 |
| 15 | −3.15868970E−02 | 6.98678310E−03 | −1.02919410E−03 | 9.09719780E−05 | −3.57059970E−06 |

| | A17 | A18 | A19 | A20 |
|---|---|---|---|---|
| 2 | 2.70563510E−06 | 1.29282980E−06 | 2.59412160E−06 | −1.04155460E−05 |
| 5 | −4.49863420E−05 | −2.41788220E−05 | 1.05635920E−06 | 2.45206290E−05 |
| 6 | 1.61620030E−05 | 2.05838670E−06 | −2.40569650E−05 | −3.71824400E−06 |
| 7 | 7.35953500E−05 | 1.39806450E−04 | 1.93702330E−04 | 2.18908010E−04 |
| 8 | 1.33439550E−05 | −1.27254560E−05 | −3.36537390E−05 | −4.82474600E−05 |
| 9 | −1.44559330E−05 | −1.22678990E−05 | 1.00219970E−06 | 7.63225730E−06 |
| 10 | −6.65290300E−07 | −4.79218730E−08 | 1.80518140E−07 | 2.90932100E−07 |
| 11 | −2.28214370E−08 | −1.99576590E−07 | −2.35779250E−07 | −1.78179610E−07 |
| 12 | −5.82558640E−07 | −1.72045600E−07 | −3.07638950E−08 | 8.30584240E−09 |
| 13 | 1.64225840E−07 | −2.23382360E−07 | −2.70060280E−07 | −2.14848160E−07 |
| 14 | −3.12498400E−08 | −1.31970460E−08 | −5.61330950E−09 | −2.34778860E−09 |
| 15 | −3.08865860E−09 | −4.72017530E−10 | 7.33886540E−11 | 1.25723340E−10 |

TABLE 9

EXAMPLE 5
f = 4.212, Bf = 0.673

| Si | Ri | Di | Ndj | ν dj |
|---|---|---|---|---|
| 1(APERTURE STOP) | ∞ | −0.249 | | |
| *2 | 2.4818 | 0.287 | 1.544884 | 54.87 |
| *3 | 3.3918 | 0.200 | | |
| *4 | 2.8264 | 0.498 | 1.544884 | 54.87 |
| *5 | −16.2063 | 0.081 | | |
| *6 | −4.5379 | 0.068 | 1.633506 | 23.63 |
| *7 | 15.8277 | 0.481 | | |
| *8 | 6.9864 | 0.618 | 1.544884 | 54.87 |
| *9 | 33.7741 | 0.499 | | |
| *10 | 7.6175 | 0.611 | 1.544884 | 54.87 |

TABLE 9-continued

EXAMPLE 5
f = 4.212, Bf = 0.673

| Si | Ri | Di | Ndj | ν dj |
|---|---|---|---|---|
| *11 | −4.2651 | 0.449 | | |
| *12 | −3.4899 | 0.190 | 1.544884 | 54.87 |
| *13 | −1.8452 | 0.439 | | |
| *14 | −1.7987 | 0.383 | 1.544884 | 54.87 |
| *15 | 3.0918 | 0.287 | | |
| 16 | ∞ | 0.145 | 1.516330 | 64.14 |
| 17 | ∞ | 0.435 | | |
| 18 | ∞ | | | |

*ASPHERICAL SURFACE

TABLE 10

EXAMPLE 5·ASPHERICAL SURFACE DATA

| SURFACE NUMBER | KA | A4 | A6 | A8 | A10 |
|---|---|---|---|---|---|
| 2 | −3.63023345E−01 | −3.31345472E−02 | 2.75518601E−01 | −8.20921813E−01 | 1.39351535E+00 |
| 3 | 1.13586389E−01 | −3.50805416E−03 | 4.22231263E−03 | 4.37491855E−04 | −2.31481957E−05 |
| 4 | 1.20363044E+00 | −1.44423656E−02 | −1.26591771E−02 | −5.63581080E−03 | 5.47164710E−04 |
| 5 | −2.01918382E+03 | −1.19053656E−01 | 5.19779993E−01 | −1.48547477E+00 | 2.43731681E+00 |
| 6 | 1.22841760E+01 | 1.66142027E−01 | −3.64400096E−01 | 8.63558322E−01 | −1.49039283E+00 |
| 7 | 1.72614226E+02 | 2.37723532E−01 | −1.27230014E+00 | 4.46319589E+00 | −9.76822835E+00 |
| 8 | 2.65460542E+01 | 3.38546394E−02 | −6.87009109E−01 | 2.23966975E+00 | −4.46647719E+00 |
| 9 | 3.51623838E+02 | −6.94907201E−02 | 9.68978624E−02 | −4.94938538E−01 | 1.08905813E+00 |
| 10 | −4.98065361E+01 | 1.97950357E−02 | −5.44727595E−02 | 1.07252980E−01 | −1.48882818E−01 |
| 11 | 2.65644518E+00 | 8.72196913E−03 | 1.38346213E−02 | −2.81954804E−02 | 2.24419558E−02 |
| 12 | 8.85913425E−01 | −3.09380694E−03 | −4.55372810E−02 | 4.46688820E−02 | −3.53179175E−02 |
| 13 | −5.68277183E−02 | 1.67306039E−01 | −2.79398130E−01 | 2.96069443E−01 | −2.00023697E−01 |
| 14 | 4.55241729E−01 | 8.01454505E−02 | −1.57096878E−01 | 1.67893270E−01 | −1.06718394E−01 |
| 15 | −1.37962822E+00 | −8.83614679E−02 | 3.13190271E−02 | −6.90794866E−03 | 5.86170146E−05 |

| | A12 | A14 | A16 | A18 | A20 |
|---|---|---|---|---|---|
| 2 | −1.40471245E+00 | 8.51634350E−01 | −3.00392241E−01 | 5.55854719E−02 | −4.12697984E−03 |
| 3 | −3.88474155E−04 | −7.70721406E−05 | −4.42622026E−05 | −1.81012345E−05 | −1.20921385E−04 |
| 4 | 1.21058842E−03 | 4.30104500E−04 | −1.12990506E−04 | −2.45757272E−04 | −1.55055457E−04 |
| 5 | −2.48878371E+00 | 1.59852760E+00 | −6.29996001E−01 | 1.39669141E−01 | −1.33253062E−02 |
| 6 | 1.70086286E+00 | −1.25050938E+00 | 5.65517526E−01 | −1.42223585E−01 | 1.62991919E−02 |
| 7 | 1.34352941E+01 | −1.16421241E+01 | 6.15522415E+00 | −1.81168720E+00 | 2.29456222E−01 |
| 8 | 5.55864187E+00 | −4.36216037E+00 | 2.09743335E+00 | −5.64910883E−01 | 6.60755744E−02 |
| 9 | −1.42016621E+00 | 1.14651385E+00 | −5.63454481E−01 | 1.54296260E−01 | −1.79509230E−02 |
| 10 | 1.13789613E−01 | −5.34032699E−02 | 1.52056665E−02 | −2.43374872E−03 | 1.74679086E−04 |
| 11 | −1.41274765E−02 | 5.63961200E−03 | −1.34993277E−03 | 1.87115259E−04 | −1.07740737E−05 |
| 12 | 1.90446451E−02 | −6.35339978E−03 | 1.29110270E−03 | −1.48110909E−04 | 7.27514560E−06 |
| 13 | 8.64184478E−02 | −2.36487335E−02 | 3.95855358E−03 | −3.68455728E−04 | 1.44962584E−05 |
| 14 | 4.28948610E−02 | −1.08656190E−02 | 1.68255344E−03 | −1.45493806E−04 | 5.37842712E−06 |
| 15 | 3.64212809E−04 | −9.06997678E−05 | 1.02704073E−05 | −5.84588356E−07 | 1.41810732E−08 |

TABLE 11

EXAMPLE 6
f = 4.209, Bf = 0.723

| Si | Ri | Di | Ndj | ν dj |
|---|---|---|---|---|
| 1(APERTURE STOP) | ∞ | −0.199 | | |
| *2 | 2.6145 | 0.239 | 1.544884 | 54.87 |
| *3 | 4.5059 | 0.099 | | |
| *4 | 3.0669 | 0.567 | 1.544884 | 54.87 |
| *5 | −19.6092 | 0.114 | | |
| *6 | −4.7209 | 0.100 | 1.633506 | 23.63 |
| *7 | 16.8496 | 0.602 | | |
| *8 | 7.1188 | 0.535 | 1.544884 | 54.87 |
| *9 | 26.0084 | 0.568 | | |
| *10 | 19.6594 | 0.312 | 1.544884 | 54.87 |
| *11 | −3.9806 | 0.291 | | |
| *12 | −4.0580 | 0.377 | 1.544884 | 54.87 |
| *13 | −1.7623 | 0.481 | | |
| *14 | −1.7757 | 0.322 | 1.544884 | 54.87 |
| *15 | 3.6618 | 0.323 | | |
| 16 | ∞ | 0.145 | 1.516330 | 64.14 |
| 17 | ∞ | 0.304 | | |
| 18 | | | | |

*ASPHERICAL SURFACE

TABLE 12

EXAMPLE 6·ASPHERICAL SURFACE DATA

| SURFACE NUMBER | KA | A4 | A6 | A8 | A10 |
|---|---|---|---|---|---|
| 2 | −3.73762000E−01 | −3.19345160E−02 | 2.76169150E−01 | −8.21074570E−01 | 1.39354030E+00 |
| 3 | −7.59500000E−03 | −8.68858030E−03 | 1.76206270E−03 | 1.53914570E−04 | −2.34415900E−04 |
| 4 | 1.23588240E+00 | −2.05608110E−02 | −6.94927120E−03 | −2.01491220E−03 | 1.23188550E−04 |
| 5 | −2.34905700E+03 | −1.04807730E−01 | 5.24061310E−01 | −1.48290470E+00 | 2.43957030E+00 |
| 6 | 1.22417900E+01 | 1.58837370E−01 | −3.57064060E−01 | 8.65676960E−01 | −1.49120240E+00 |
| 7 | 1.62883400E+02 | 2.36905500E+01 | −1.26684380E+00 | 4.46130740E+00 | −9.76793210E+00 |
| 8 | 2.61862600E+01 | 4.41532260E−02 | −6.81492850E−01 | 2.24334950E+00 | −4.46845760E+00 |
| 9 | 3.52644200E+02 | −6.22833360E−02 | 9.96171640E−02 | −4.95352240E−01 | 1.08838680E+00 |
| 10 | −1.09198700E+02 | 1.93327260E−02 | −5.58797220E−02 | 1.11906270E−01 | −1.49668000E−01 |
| 11 | 2.67232000E+00 | 1.43599060E−02 | 1.70248450E−02 | −2.81120930E−02 | 2.25088180E−02 |
| 12 | 6.90794400E−01 | 5.03276790E−03 | −4.44792310E−02 | 4.47834330E−02 | −3.52435840E−02 |
| 13 | −5.26010000E−02 | 1.71254200E−01 | −2.79549780E−01 | 2.96098150E−01 | −2.00045450E−01 |
| 14 | 4.88936000E−01 | 7.55987090E−02 | −1.57029210E−01 | 1.67838860E−01 | −1.06735910E−01 |
| 15 | −1.46576100E+00 | −8.25839940E−02 | 2.96203240E−02 | −6.94699900E−03 | 6.93480960E−05 |

TABLE 12-continued

EXAMPLE 6·ASPHERICAL SURFACE DATA

| | A12 | A14 | A16 | A18 | A20 |
|---|---|---|---|---|---|
| 2 | −1.40462130E+00 | 8.51327790E−01 | −3.00278700E−01 | 5.57185700E−02 | −4.05237560E−03 |
| 3 | −9.59708490E−05 | 2.39609440E−05 | 5.09885360E−05 | 6.76885720E−05 | 2.86815980E−05 |
| 4 | 1.26568550E−04 | −1.61095600E−04 | −2.42720260E−04 | −2.89347810E−05 | 1.69855240E−04 |
| 5 | −2.48697820E+00 | 1.59837240E+00 | −6.31903550E−01 | 1.37532200E−01 | −1.55528230E−02 |
| 6 | 1.69924920E+00 | −1.25078610E+00 | 5.66425610E−01 | −1.41066420E−01 | 1.55832770E−02 |
| 7 | 1.34388310E+01 | −1.16375520E+01 | 6.15433830E+00 | −1.81239410E+00 | 2.31697540E−01 |
| 8 | 5.55864510E+00 | −4.36051780E+00 | 2.09887280E+00 | −5.64941280E−01 | 6.50051450E−02 |
| 9 | −1.42000170E+00 | 1.14708180E+00 | −5.63164530E−01 | 1.54177980E−01 | −1.80161570E−02 |
| 10 | 1.13639310E−01 | −5.34123790E−02 | 1.52141140E−02 | −2.43543160E−03 | 1.70717920E−04 |
| 11 | −1.41119710E−02 | 5.64731380E−03 | −1.34663620E−03 | 1.86832930E−04 | −1.03181730E−05 |
| 12 | 1.90485910E−02 | −6.35744340E−03 | 1.28957620E−03 | −1.48640320E−04 | 7.33347990E−06 |
| 13 | 8.64116810E−02 | −2.36507580E−02 | 3.95800310E−03 | −3.68547140E−04 | 1.44778190E−05 |
| 14 | 4.28918110E−02 | −1.08660940E−02 | 1.68251620E−03 | −1.45498780E−04 | 5.37668610E−06 |
| 15 | 3.65610890E−04 | −9.06590590E−05 | 1.02620410E−05 | −5.87149300E−07 | 1.37799960E−08 |

TABLE 13

EXAMPLE 7
f = 4.208, Bf = 0.804

| Si | Ri | Di | Ndj | νdj |
|---|---|---|---|---|
| 1(APERTURE STOP) | ∞ | −0.349 | | |
| *2 | 2.2213 | 0.488 | 1.544884 | 54.87 |
| *3 | 31.4021 | 0.177 | | |
| *4 | 1333.1730 | 0.339 | 1.544884 | 54.87 |
| *5 | −18.2752 | 0.107 | | |
| *6 | −4.6653 | 0.043 | 1.633506 | 23.63 |
| *7 | 14.1679 | 0.340 | | |
| *8 | 6.5754 | 0.692 | 1.544884 | 54.87 |
| *9 | 25.4716 | 0.553 | | |
| *10 | 29.8791 | 0.206 | 1.544884 | 54.87 |
| *11 | −6.5991 | 0.299 | | |
| *12 | −9.0568 | 0.709 | 1.544884 | 54.87 |
| *13 | −1.4389 | 0.535 | | |
| *14 | −2.4566 | 0.259 | 1.544884 | 54.87 |
| *15 | 1.8570 | 0.455 | | |
| 16 | ∞ | 0.145 | 1.516330 | 64.14 |
| 17 | ∞ | 0.254 | | |
| 18 | ∞ | | | |

*ASPHERICAL SURFACE

TABLE 14

EXAMPLE 7·ASPHERICAL SURFACE DATA

| SURFACE NUMBER | KA | A3 | A4 | A5 | A6 |
|---|---|---|---|---|---|
| 3 | −3.15864600E+01 | 0.00000000E+00 | 3.14621590E−03 | 0.00000000E+00 | 2.14129870E−03 |
| 4 | 1.00000000E+00 | 0.00000000E+00 | −3.70189120E−03 | 0.00000000E+00 | −4.58875950E−04 |

| | A7 | A8 | A9 | A10 | A11 |
|---|---|---|---|---|---|
| 3 | 0.00000000E+00 | −4.72746350E−04 | 0.00000000E+00 | 4.15361990E−04 | 0.00000000E+00 |
| 4 | 0.00000000E+00 | −4.94490450E−04 | 0.00000000E+00 | −6.27715970E−04 | 0.00000000E+00 |

| | A12 | A13 | A14 | A15 | A16 |
|---|---|---|---|---|---|
| 3 | −4.47947750E−05 | 0.00000000E+00 | 2.15806080E−04 | 0.00000000E+00 | 2.08514500E−04 |
| 4 | −4.79906810E−05 | 0.00000000E+00 | 1.33017740E−04 | 0.00000000E+00 | 3.22889880E−04 |

| SURFACE NUMBER | KA | A3 | A4 | A5 | A6 |
|---|---|---|---|---|---|
| 2 | 5.83818800E−01 | −5.35364820E−02 | 3.03298840E−01 | −1.36076100E+00 | 6.51732950E+00 |
| 5 | 1.18483800E+02 | −4.40551660E−02 | 1.67371010E−01 | −2.55793890E−01 | −2.67582480E−01 |
| 6 | 1.08951440E+01 | 1.69410780E−01 | 2.62325900E−01 | −5.67192870E−01 | 7.46249680E−01 |
| 7 | 1.34906500E+02 | 6.43183840E−02 | 2.09925820E−01 | 6.32083440E−02 | −1.68032730E+00 |
| 8 | 2.93608400E+01 | −2.50376490E−02 | 1.59591980E−01 | −8.78270750E−01 | 1.31383460E+00 |
| 9 | 2.58118500E+02 | −2.60695800E−02 | −1.19247000E−01 | 8.82765360E−01 | −4.41406420E+00 |
| 10 | −1.03543800E+03 | 9.39160430E−03 | −4.57228500E−03 | 1.76039430E−01 | −1.20840960E+00 |
| 11 | 3.65532900E+00 | −3.98432270E−03 | −8.12247430E−04 | −5.05251210E−04 | −1.99970140E−04 |
| 12 | 1.99078300E+01 | −9.52585000E−03 | −8.83768140E−03 | −4.03437880E−03 | −1.34419130E−03 |
| 13 | −9.86639000E−01 | 3.03748040E−02 | 1.19632860E−01 | −3.18394170E−01 | 8.64440810E−01 |
| 14 | 5.10883900E−01 | 3.49288270E−02 | 9.57296200E−02 | −3.29599150E−01 | 6.33486070E−01 |
| 15 | −2.69030900E+00 | 3.46947180E−02 | −3.04837470E−01 | 4.04138930E−01 | −3.70147210E−01 |

| | A7 | A8 | A9 | A10 | A11 |
|---|---|---|---|---|---|
| 2 | −2.69426670E+01 | 8.23146390E+01 | −1.81239710E+02 | 2.90760380E+02 | −3.42827780E+02 |
| 5 | 1.10333800E+00 | −9.14293200E−01 | −2.79109830E−01 | 5.83965190E−01 | −6.17927180E−02 |
| 6 | −2.33747420E−01 | −7.92255310E−01 | 9.72528280E−01 | −2.24718860E−01 | 5.07608730E−03 |

TABLE 14-continued

EXAMPLE 7•ASPHERICAL SURFACE DATA

| | | | | | |
|---|---|---|---|---|---|
| 7 | 1.07571480E+01 | −3.69342420E+01 | 8.28216740E+01 | −1.31681050E+02 | 1.53443530E+02 |
| 8 | −3.93679380E−01 | −1.24136050E+00 | 1.48150930E+00 | −3.62663240E−01 | −1.78533180E−01 |
| 9 | 1.42481170E+01 | −3.28939840E+01 | 5.56601930E+01 | −6.94672590E+01 | 6.36927350E+01 |
| 10 | 3.79733120E+00 | −7.78776520E+00 | 1.14821650E+01 | −1.25022120E+01 | 1.00428950E+01 |
| 11 | −1.53288360E−04 | −7.44026130E−05 | −2.95933490E−06 | −1.40846000E−06 | 1.03457950E−05 |
| 12 | −9.42964670E−05 | 1.19881570E−04 | 8.39148440E−05 | 6.06890040E−05 | 2.63555350E−05 |
| 13 | −2.21920410E+00 | 4.00723100E+00 | −5.12168740E+00 | 4.78462130E+00 | −3.30169340E+00 |
| 14 | −9.72959210E−01 | 1.19681620E+00 | −1.12832800E+00 | 7.78540390E−01 | −3.85537940E−01 |
| 15 | 3.84252640E−01 | −4.15340400E−01 | 3.55170610E−01 | −2.21477900E−01 | 9.92529010E−02 |

| | A12 | A13 | A14 | A15 | A16 |
|---|---|---|---|---|---|
| 2 | 2.95556980E+02 | −1.81604580E+02 | 7.51999810E+01 | −1.87339950E+01 | 2.11193450E+00 |
| 5 | 2.79478160E−01 | −7.83889710E−01 | 6.09942410E−01 | −1.93490480E−01 | 2.21980410E−02 |
| 6 | −3.22263320E−01 | 2.28491160E−01 | 6.33520290E−02 | −9.63375740E−02 | 2.40408810E−02 |
| 7 | −1.31081450E+02 | 7.98824980E+01 | −3.27593670E+01 | 8.06369390E+00 | −8.96039880E−01 |
| 8 | −2.21871940E−01 | 4.48354530E−01 | −2.27532150E−01 | 3.30125820E−02 | 2.34430540E−03 |
| 9 | −4.22821820E+01 | 1.97327020E+01 | −6.13254330E+00 | 1.14108920E+00 | −9.69705320E−02 |
| 10 | −5.88255140E+00 | 2.45505140E+00 | −6.96389020E−01 | 1.20781370E−01 | −9.59656220E−03 |
| 11 | 9.66324460E−06 | 6.72671450E−06 | 4.37839660E−06 | 3.17455710E−06 | 2.25271140E−08 |
| 12 | 1.45248340E−05 | 4.30996110E−06 | 2.01397250E−06 | 5.50750920E−07 | −1.30400130E−07 |
| 13 | 1.66122380E+00 | −5.89188710E−01 | 1.38859940E−01 | −1.95697030E−02 | 1.28372520E−03 |
| 14 | 1.35519620E−01 | −3.29722790E−02 | 5.27348450E−03 | −4.93528930E−04 | 1.85698530E−05 |
| 15 | −3.15864430E−02 | 6.98737190E−03 | −1.02914450E−03 | 9.09755890E−05 | −3.58127510E−06 |

| | A17 | A18 | A19 | A20 |
|---|---|---|---|---|
| 2 | 1.50048100E−04 | 2.91187820E−05 | −8.64001720E−05 | −1.58342460E−04 |
| 5 | −5.82499720E−05 | 3.50084500E−05 | −2.81609680E−04 | −8.39167090E−05 |
| 6 | −1.12054960E−05 | −6.12230520E−05 | −7.69757270E−05 | −1.01738980E−04 |
| 7 | 8.41817110E−06 | −3.27167170E−06 | 9.10379620E−06 | −3.14415150E−07 |
| 8 | −1.72279680E−04 | −1.92409610E−04 | −2.31868120E−04 | −2.29118890E−04 |
| 9 | 4.71495850E−06 | 1.43406740E−06 | −2.02610570E−06 | −4.24338530E−06 |
| 10 | 1.67628350E−06 | 1.09835090E−06 | 6.77604310E−07 | 4.42695930E−07 |
| 11 | 1.22614080E−06 | 7.55817120E−07 | 4.76655740E−07 | 2.47631070E−07 |
| 12 | 4.41296170E−08 | −1.42832270E−07 | −6.10589920E−08 | −2.64077920E−08 |
| 13 | 1.72969250E−07 | 4.67661010E−08 | 1.61906930E−08 | −4.07792820E−08 |
| 14 | −1.02087140E−08 | −1.05957640E−10 | 1.12487400E−09 | 1.56670370E−09 |
| 15 | 1.15789350E−09 | 4.70333420E−10 | 1.80373550E−10 | 5.42734630E−11 |

TABLE 15

VALUE RELATED TO CONDITIONAL FORMULA

| FORMULA NUMBER | CONDITIONAL FORMULA | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| 1 | f/f67 | −1.165 | −1.146 | −1.006 | −1.022 | −1.345 | −1.045 | −0.433 |
| 2 | f/f123 | 0.551 | 0.521 | 0.638 | 0.639 | 0.529 | 0.604 | 0.460 |
| 3 | min ν d | 23.63 | 23.63 | 23.63 | 23.63 | 23.63 | 23.63 | 23.63 |
| 4 | ΣDt/ΣD | 0.544 | 0.565 | 0.627 | 0.628 | 0.553 | 0.532 | 0.576 |
| 5 | ΣDt/TCL | 0.478 | 0.494 | 0.549 | 0.554 | 0.485 | 0.460 | 0.493 |
| 6 | f/f1 | 0.355 | 0.363 | 0.617 | 0.614 | 0.276 | 0.385 | 0.965 |
| 7 | ΣDt/ΣDa | 0.914 | 0.975 | 1.219 | 1.242 | 0.941 | 0.852 | 0.972 |
| 8 | f/f6 | 0.764 | 0.811 | 0.935 | 0.929 | 0.61 | 0.779 | 1.384 |
| 9 | f/f12 | 1.186 | 1.122 | 1.196 | 1.193 | 1.167 | 1.202 | 1.071 |

What is claimed is:

1. An imaging lens substantially consisting of seven lenses of:
a first lens that has positive refractive power in the vicinity of an optical axis and a convex surface facing an object side in the vicinity of the optical axis;
a second lens;
a third lens;
a fourth lens;
a fifth lens;
a sixth lens; and
a seventh lens having a concave surface facing an image side in the vicinity of the optical axis, and at least one of the surfaces of which includes an inflection point, and both of the surfaces of which are aspherical, which are in this order from the object side,
wherein each of the first lens through the seventh lens is a single lens, and
wherein the following conditional formula is satisfied:

$$f/f67 < 0 \qquad (1),$$

where f is a focal length of an entire system, and
f67 is a combined focal length of the sixth lens and the seventh lens.

2. The imaging lens, as defined in claim 1, wherein the following conditional formula is further satisfied:

$$0 < f/f123 < 1 \qquad (2),$$

where f: a focal length of an entire system, and f123: a combined focal length of the first lens, the second lens and the third lens.

3. The imaging lens, as defined in claim 1, further comprising:

an aperture stop arranged on the object side of an object-side surface of the third lens.

4. The imaging lens, as defined in claim 1, wherein the following conditional formula is further satisfied:

$$minvd < 35 \quad (3), \text{where}$$

minvd: the smallest one of Abbe numbers for d-line of lenses with negative refractive power included in the imaging lens.

5. The imaging lens, as defined in claim 1, wherein the following conditional formula is further satisfied:

$$0.2 < \Sigma Dt/\Sigma D < 0.67 \quad (4), \text{where}$$

ΣDt: a sum of center thicknesses of the first lens through the seventh lens, and ΣD: a length on the optical axis from an object-side surface of the first lens to an image-side surface of the seventh lens.

6. The imaging lens, as defined in claim 1, wherein the following conditional formula is further satisfied:

$$0.2 < \Sigma Dt/TCL < 0.6 \quad (5), \text{where}$$

ΣDt: a sum of center thicknesses of the first lens through the seventh lens, and TCL: a length on the optical axis from an object-side surface of the first lens to an image formation surface.

7. The imaging lens, as defined in claim 1, wherein the following conditional formula is further satisfied:

$$0 < f/f1 < 1.1 \quad (6), \text{where}$$

f: a focal length of an entire system, and f1: a focal length of the first lens.

8. The imaging lens, as defined in claim 1, wherein the first lens has a meniscus shape in the vicinity of the optical axis.

9. The imaging lens, as defined in claim 1, wherein the second lens has a convex surface facing the object side in the vicinity of the optical axis.

10. The imaging lens, as defined in claim 1, wherein the third lens has a concave surface facing the object side in the vicinity of the optical axis.

11. The imaging lens, as defined in claim 1, wherein the fourth lens has a convex surface facing the object side in the vicinity of the optical axis.

12. The imaging lens, as defined in claim 1, wherein the sixth lens has a convex surface facing the image side in the vicinity of the optical axis.

13. The imaging lens, as defined in claim 1, wherein the following conditional formula is further satisfied:

$$0 < f/f6 < 1.52 \quad (8), \text{where}$$

f: a focal length of an entire system, and f6: a focal length of the sixth lens.

14. The imaging lens, as defined in claim 1, wherein the following conditional formula is further satisfied:

$$0.2 < f/f123 < 0.72 \quad (2\text{-}1), \text{where}$$

f: a focal length of an entire system, and f123: a combined focal length of the first lens, the second lens and the third lens.

15. The imaging lens, as defined in claim 1, wherein the following conditional formula is further satisfied:

$$-2 < f/f67 < -0.1 \quad (1\text{-}1), \text{where}$$

f: a focal length of an entire system, and f67: a combined focal length of the sixth lens and the seventh lens.

16. An imaging apparatus comprising:

the imaging lens, as defined in claim 1.

17. An imaging lens substantially consisting of seven lenses of:

a first lens that has positive refractive power in the vicinity of an optical axis and a convex surface facing an object side in the vicinity of the optical axis;

a second lens;

a third lens;

a fourth lens;

a fifth lens;

a sixth lens; and a seventh lens having a concave surface facing an image side in the vicinity of the optical axis, and at least one of the surfaces of which includes an inflection point, and both of the surfaces of which are aspherical, which are in this order from the object side, wherein each of the first lens through the seventh lens is a single lens, and wherein the following conditional formula is satisfied:

$$0.2 < \Sigma Dt/\Sigma Da < 2.6 \quad (7), \text{where}$$

ΣDt: a sum of center thicknesses of the first lens through the seventh lens, and ΣDa: a sum of the lengths of air spaces on the optical axis from an image-side surface of the first lens through an object-side surface of the seventh lens.

18. An imaging lens substantially consisting of seven lenses of:

a first lens that has positive refractive power in the vicinity of an optical axis and a convex surface facing an object side in the vicinity of the optical axis;

a second lens;

a third lens;

a fourth lens;

a fifth lens;

a sixth lens; and a seventh lens having a concave surface facing an image side in the vicinity of the optical axis, and at least one of the surfaces of which includes an inflection point, and both of the surfaces of which are aspherical, which are in this order from the object side, wherein each of the first lens through the seventh lens is a single lens, and wherein the fifth lens has positive refractive power in the vicinity of the optical axis.

* * * * *